US009836573B2

(12) United States Patent
Gupte et al.

(10) Patent No.: US 9,836,573 B2
(45) Date of Patent: Dec. 5, 2017

(54) METHOD AND SYSTEM FOR MULTILATERAL VALIDATION OF WIRE HARNESS DESIGN OUTPUTS

(71) Applicant: TATA TECHNOLOGIES PTE LIMITED, Singapore (IN)

(72) Inventors: Keyur Gupte, Maharashtra (IN); Pratap Thorat, Maharashtra (IN); Renu Raheja, Maharashtra (IN); Tejaswini Kothawade, Maharashtra (IN); P V Kaulgud, Maharashtra (IN); Shailesh Newase, Maharashtra (IN)

(73) Assignee: TATA TECHNOLOGIES PTE_Limited, Singapore, OT (SG)

( * ) Notice: Subject to any disclaimer, the term of this patent is extended or adjusted under 35 U.S.C. 154(b) by 600 days.

(21) Appl. No.: 14/537,916

(22) Filed: Nov. 11, 2014

(65) Prior Publication Data

US 2016/0110482 A1 Apr. 21, 2016

(30) Foreign Application Priority Data

Oct. 16, 2014 (IN) .......................... 3315/MUM/2014

(51) Int. Cl.
*G06F 17/50* (2006.01)
(52) U.S. Cl.
CPC .......... *G06F 17/509* (2013.01); *G06F 17/50* (2013.01); *G06F 17/5004* (2013.01); *G06F 2217/02* (2013.01); *G06F 2217/36* (2013.01)

(58) Field of Classification Search
CPC .................................................. G06F 17/5004
USPC ............................................................. 713/1
See application file for complete search history.

(56) References Cited

PUBLICATIONS

John Chacko, Electrical Build Issues in Automotive Product Development—An Analysis, Oct. 2007.*

\* cited by examiner

*Primary Examiner* — Lechi Truong

(57) ABSTRACT

System and Method for multilateral Validation of Wire Harness Design Outputs wherein said method comprises of validating with respect to one another and with respect to component database, the background data files (BDF). Such BDFs are generated by software platforms for creating two dimensional circuit schematic and two dimensional & three dimensional wire harness outputs and are not friendly for use by humans. The system as per said method is a computer program, capable of plugging-in on product Life Cycle management Software suites. The system and method makes validation possible by comparing BDF instead of conventional validation of comparing the technical contents by skilled designers, thus saves need of skilled designers, besides saving time and improving quality of Wire harness Design Outputs.

21 Claims, 38 Drawing Sheets

| Component | Part Number | Instance Name | Other Identifications |
|---|---|---|---|
| Connector | 100003480 | C001BM 3 | |
| | | C001BM 4 | |
| | | C001BM 7 | |
| Connector | 100004610 | C088-1 | |
| | | C088-2 | |
| Connector | 100011230 | C167B | |
| | | C098 | |
| Grommet | 127000990 | G001 | |
| Clip | 108001650 | CL001 | |
| | | CL002 | |
| | | CL003 | |
| Splice | 101001810 | S111 | |
| | | S152 | |

FIGURE - 3

| Component | INSTANCE NAME | COLOUR | SIZE | MATERIAL | OPTION |
|---|---|---|---|---|---|
| WIRE | 18D | Y/R | 0.75 | FLRYB | (E) |
| WIRE | 19B | G/R | 0.75 | FLRYB | (E) |
| WIRE | 66B | W/BR | 0.35 | FLRYA | (D) |
| WIRE | 67B | W/B | 0.35 | FLRYA | (D) |
| WIRE | 441A | L | 2.00 | ISBT | (D) |
| WIRE | 44A | L/B | 2.00 | ISBT | (D) |
| WIRE | 414L | L/O | 0.35 | FLRYA | (D) |
| WIRE | 47G | GY | 0.35 | FLRYA | (D) |
| WIRE | 79A | W/O | 0.35 | FLRYA | (D) |
| WIRE | 93 | LG/R | 0.50 | FLRYB | (TN) |
| WIRE | 16 | LG/R | 0.50 | FLRYB | (TW) |
| WIRE | 94 | LG | 0.50 | FLRYB | (TN) |
| WIRE | 31 | LG | 0.50 | FLRYB | (TW) |

FIGURE - 3A

```
% Harness wire specification
%
18D:(E):0.75:Y/R::FLRYB::C098::2::C001BM::1::TRUE:TRUE::C8#3FD20#4182C:NEITHER:0.0
19B:(E):0.75:G/R::FLRYB::C098::1::C001BM::2::TRUE:TRUE::C8#3E8BD#4182D:NEITHER:0.0
47G:(D):0.35:GY::FLRYA::C272::1::C001BM::8::TRUE:TRUE::C8#3E8C9#41833:NEITHER:0.0
67B:(D):0.35:W/B::FLRYA::C272::5::C001BM::4::TRUE:TRUE::C8#3F901#4182F:NEITHER:0.0
66B:(D):0.35:W/BR::FLRYA::C272::6::C001BM::3::TRUE:TRUE::C8#3F902#4182E:NEITHER:0.1
414L:(D):0.35:L/O::FLRYA::C001BM::7::C272::2::TRUE:TRUE::C8#41832#3F9CE:NEITHER:0.(
79A:(D):0.35:W/O::FLRYA::C001BM::9::C272::4::TRUE:TRUE::C8#41834#3F9D0:NEITHER:0.0
16:(TW):0.50:LG/R::FLRYB::Tw49:C001BM::10::S112::1::TRUE:TRUE::C8#48735#483A6:NEITHI
16A:(TW):0.50:LG/R::FLRYB::Tw50:C282A::2::S112::2::TRUE:TRUE::C8#483C0#483A7:NEITHEI
31:(TW):0.50:LG::FLRYB::Tw49:C001BM::11::S152::1::TRUE:TRUE::C8#48736#483A8:NEITHER
31A:(TW):0.50:LG::FLRYB::Tw50:C282A::1::S152::2::TRUE:TRUE::C8#483BF#483AC:NEITHER:(
16B:(TW):0.50:LG/R::FLRYB::Tw51:S112::3::C167B::2::TRUE:TRUE::C8#483A8#48095:NEITHEI
31B:(TW):0.50:LG::FLRYB::Tw51:S152::3::C167B::1::TRUE:TRUE::C8#483A0#48094:NEITHER:(
44A:(D):2.00:L/B::ISBT::S111::1::C001BM::6::TRUE:TRUE::C8#487D7#41831:NEITHER:0.0
441A:(D):2.00:L::ISBT::C001BM::5::S45::1::TRUE:TRUE::C8#41830#487D2:NEITHER:0.0:::
93:(TN):0.50:LG/R::FLRYB::C001BM::10::C282A::2::TRUE:TRUE::C8#41835#47F98:NEITHER:)
94:(TN):0.50:LG::FLRYB::C001BM::11::C282A::1::TRUE:TRUE::C8#41836#47F9C:NEITHER:0.(
44B:(D):2.50:L/B::FLRYB::S111::2::C088::1::TRUE:TRUE::C8#48708#3E8BF:NEITHER:1020.(
%
% Harness node components
%
CLIP2::::CLIP::::1::::NO:NO:::::::AUTOMATIC::Default:::no::
CLIP2::::NODE-OPEN::CLIP::108001650:1:::::NO:NO::::::::AUTOMATIC::Default:::no::
C098::::CONNECTOR::C098 RR DOOR LH ACTUATOR::100100770:1:::::NO:NO::::::::AUTOMATIC
CLIP3::::CLIP::::1::::NO:NO::::::::AUTOMATIC::Default:::no::
CLIP3::::NODE-OPEN::CLIP::108001650:1:::::NO:NO::::::::AUTOMATIC::Default:::no::
CLIP4::::CLIP::::1::::NO:NO::::::::AUTOMATIC::Default:::no::
CLIP4::::NODE-OPEN::CLIP::108001650:1:::::NO:NO::::::::AUTOMATIC::Default:::no::
N-58::::NODE-TAPE::GROMMET::127000990:1:::::NO:NO::::::::AUTOMATIC::Default:::no::
N-769::::NODE-TAPE::::NODE-TAPE:1:::::NO:NO::::::::AUTOMATIC::Default:::no::
CLIP8::::CLIP::::1::::NO:NO::::::::AUTOMATIC::Default:::no::
CLIP8::::NODE-OPEN::CLIP::108001650:1:::::NO:NO::::::::AUTOMATIC::Default:::no::
C272::::CONNECTOR::C272 REAR LEFT WINDOW SWITCH::100011890:1:::::NO:NO::::::::AUTOM
N-179::::NODE-TAPE::::NODE-TAPE:1:::::NO:NO::::::::AUTOMATIC::Default:::no::
CLIP1::::CLIP::::1::::NO:NO::::::::AUTOMATIC::Default:::no::
CLIP1::::NODE-OPEN::CLIP::108001650:1:::::NO:NO::::::::AUTOMATIC::Default:::no::
43582::::NODE-TAPE::::NODE-TAPE:1:::::NO:NO::::::::AUTOMATIC::Default:::no::
4345E::::CLIP::::1::::NO:NO::::::::AUTOMATIC::Default:::no::
4345E::::NODE-OPEN::CLIP::108001650:1:::::NO:NO::::::::AUTOMATIC::Default:::no::
```

```
1:(TW):0.50:LG:0.50:FLRYB:740.0:TW49:C001BM: :11::S152: :X::TRUE:TRUE::wire:NEITHER:0.0:
3:(TW):0.50:LG/R:0.50:FLRYB:875.0:TW65:C001BM: :10::C282A: :2::TRUE:TRUE::wire:NEITHER:0.
4:(TW):0.50:LG:0.50:FLRYB:675.0:TW65:C001BM: :11::C282A: :1::TRUE:TRUE::wire:NEITHER:0.0
6A:(TW):0.50:LG/R:0.50:FLRYB:333.0:TW50:C282A: :2::S112: :X::TRUE:TRUE::wire:NEITHER:0.0
6B:(TW):0.50:LG/R:0.50:FLRYB:780.0:TW51:S112: :X::C167B: :2::TRUE:TRUE::wire:NEITHER:0.0
8D:(ZA):0.75:Y/R:0.75:FLRYB:1410.0::C098: :2::C001BM: :1::TRUE:TRUE::wire:NEITHER:0.0:::
9B:(ZA):0.75:G/R:0.75:FLRYB:1410.0::C098: :1::C001BM: :2::TRUE:TRUE::wire:NEITHER:0.0:::
1A:(TW):0.50:LG:0.50:FLRYB:285.0:TW50:C282A: :1::S152: :X::TRUE:TRUE::wire:NEITHER:0.0:
1B:(TW):0.50:LG:0.50:FLRYB:830.0:TW51:S152: :X::C167B: :1::TRUE:TRUE::wire:NEITHER:0.0:
4A:(D):2.00:L/B:2.00:ISBT:275.0::C001BM: :6::S111: :X::TRUE:TRUE::wire:NEITHER:0.0:::::
4B:(D):2.50:L/B:2.50:FLRYB:1020.0::C088: :1::S111: :X::TRUE:TRUE::wire:NEITHER:0.0:::::
7G:(D):0.35:GY:0.35:FLRYA:1390.0::C272: :1::C001BM: :8::TRUE:TRUE::wire:NEITHER:0.0::::
6B:(D):0.35:W/BR:0.35:FLRYA:1390.0::C272: :6::C001BM: :3::TRUE:TRUE::wire:NEITHER:0.0:::
7B:(D):0.35:W/B:0.35:FLRYA:1390.0::C272: :5::C001BM: :4::TRUE:TRUE::wire:NEITHER:0.0:::
9A:(D):0.35:W/O:0.35:FLRYA:1390.0::C001BM: :9::C272: :4::TRUE:TRUE::wire:NEITHER:0.0:::
14L:(D):0.35:L/O:0.35:FLRYA:1390.0::C001BM: :7::C272: :2::TRUE:TRUE::wire:NEITHER:0.0:::
41A:(D):2.00:L:2.00:ISBT:220.0::C001BM: :5::S45: :X::TRUE:TRUE::wire:NEITHER:0.0:::::::
41B:(D):2.50:L:2.50:FLRYB:1075.0::C088: :2::S45: :X::TRUE:TRUE::wire:NEITHER:0.0:::::::

: Harness node components

:112: : : :SPLICE: :S112 Splice: ::1: : : :NO:NO:NO: : : : :
:152: : : :SPLICE: :S152 Splice: ::1: : : :NO:NO:NO: : : : :
:001BM: : : :CONNECTOR: :C001BM: :100003480:1: : : :NO:NO:NO: : : : :
:167B: : : :CONNECTOR: :C167B TWEETER RR LH: :100004610:1: : : :NO:NO:NO: : : : :
:088: : : :CONNECTOR: :C088 Rear Left Window Motor: :100011230:1: : : :NO:NO:NO: : : : :
:45: : : :SPLICE: :S45 Splice: ::1: : : :NO:NO:NO: : : : :
:272: : : :CONNECTOR: :C272 Rear Left window Switch: :100011890:1: : : :NO:NO:NO: : : : :
:282A: : : :CONNECTOR: :C282A SPEAKER RR LH: :100004610:1: : : :NO:NO:NO: : : : :
:098: : : :CONNECTOR: :C098 RR DOOR LH ACTUATOR: :100100770:1: : : :NO:NO:NO: : : : :
:111: : : :SPLICE: :S111 Splice: ::1: : : :NO:NO:NO: : : : :
```

| | PART NUMBER AND INSTANCES NAME MAPPING | | | | | | |
|---|---|---|---|---|---|---|---|
| | Data From WH DSI | | Validating WH DSI Data w.r.t CDS File | | | | |
| Sr. No. | Instance Names | 11 Digit Standard PN | Instance Name Correct in CDS | 11 Digit PN Correct in CDS | Remarks | Validation | Reviewer Comments |
| 1 | NA | 127000990 | NA | No | Grommet Part Number '127000990' not found in CDS File(DSI Line No :97) | | |
| 2 | NA | 108000570 | NA | No | Clip Part Number '108000570' not found in CDS File(DSI Line No :114) | | |
| | | | | | | | |
| Designer Name | Sign | Date | Checker Name | | Sign | Date | |

Electrical WH DSI - Circuit DSI Validation Report

COMPONENTS COUNT

|   | | Count From WH DSI | Count From Circuit DSI | Validation | Reviewers Comments |
|---|---|---|---|---|---|
| 1 | Connectors | 6 | 6 | | |
| 2 | Splices | 4 | 4 | | |

CONNECTOR PART NUMBER AND PART INSTANCE MAPPING

Successfully validated both the DSI for connector and splice part number and part instances

COMPONENT PRESENT IN WH DSI ABSENT IN CIRCUIT DSI

All the connector and splice present in WH DSI are also found in Circuit DSI

COMPONENT OF CIRCUIT DSI ABSENT IN WH DSI

All the connector and splice present in circuit DSI are also found in WH DSI

CONNECTORS IN CIRCUIT DSI WITH MISSING PART NUMBER

All the connector and splice present in circuit DSI have non-empty part number

| MISMATCH WIRE SIZE | | | | |
|---|---|---|---|---|
| All the wires present in WH DSI have same size as wires in Circuit DSI | | | | |
| MISMATCH WIRE TO INFO | | | | |
| Data From WH DSI | | | | |
| Sr. No | Instance Names | Remarks | Validation | Reviewers Comment |
| 3 | 44A-D | Wire 44A-D present in WH DSI has To component 'C0018M' whereas in circuit DSI the TO component is 'S111' | | |
| 4 | 44B-D | Wire 44B-D present in WH DSI has To component 'C088' whereas in circuit DSI the TO component is 'S111' | | |
| MISMATCH WIRE FROM INFO | | | | |
| Data From WH DSI | | | | |
| Sr. No | Instance Names | Remarks | Validation | Reviewers Comment |
| 5 | 44A-D | Wire 44A-D present in WH DSI has FROM component 'S111' whereas in circuit DSI the FROM component is 'C0018M' | | |
| 6 | 44B-D | Wire 44B-D present in WH DSI has FROM component 'S111' whereas in circuit DSI the FROM component is 'C088' | | |
| MISSING TO-FROM WIRE INFO | | | | |
| All the wires present in WH DSI and Circuit have non empty TO or FROM info | | | | |

FIGURE - 11

METHOD AND SYSTEM FOR MULTILATERAL VALIDATION OF WIRE HARNESS DESIGN OUTPUTS

FIELD OF INVENTION

The present invention relates to wire harness, particularly to a method and a system for validation of wire harness, and includes electrical as well as non-electrical wire harness.

BACKGROUND ART

Electrical wires are used to connect various devices which need electricity. Products like an automobile or even a washing machine has several devices and therefore tens of wires are required for connecting them. Industrially, instead of running individual wires from device to device, the bunch of electrical wires is prepared beforehand based on position of devices in the product. Each electrical wire has its end terminal suitably prepared so as to appropriately connect with the corresponding location at the device. Also, the bunch of electrical wires is duly mounted with grommets, wire ties, clips etc. Such a pre-prepared bunch of electrical wires with appropriately prepared end terminal is known as a "wire harness". A Wire harness may have few to few tens to few hundred wires or even more. In fact, the advantage of wire harness is actually in situations of higher and higher number of electrical wires.

While such a wire harness results into significant productivity, consistency and therefore improved quality of electrical wiring on production lines, a single error could cause the entire wire harness virtually useless. The error could be in the form of a wire of wrong colour, size, length, inappropriate end connector, grommet, splice, etc. Also, there could be redundant or missing wires.

The wire harness for complex engineering equipment, like higher end automobiles and aircraft, are so complex that visualization and relating between wire harness design and physical wire harness itself poses a challenge. Patent Application no US 012/0271596 A1, now U.S. Pat. No. 9,507,908 discloses a system and method for airplane electrical system visualization with topology determination. The disclosure includes combining three-dimensional wire harness data with logical wire content, using a computer processing device, and displays a graphical wiring topology within a three-dimensional model of the platform.

There are various design stages for creating wire harness documents which aid manufacturing of the wire harness.

U.S. Pat. No. 7,107,197 B1 describes a Wire Harness Data System for developing modular wire harness document, on the concept of virtual parent harness with multiplicity of one or more core modules, from which a customer specific harness having only one core module can be extracted. The modules may be manufactured as independent parts.

To manufacture a wire harness, correct identification and information of wires, connectors, grommets, splices, ties etc. is required wire by wire. U.S. Pat. No. 6,272,387 B2 discloses a system to aid in the manufacturing, design, testing and repairing of wiring harness, run on a computer processor. The system is primarily around data acquisition and display, locating and highlighting the located graphics on the global harness map. Patent application number KR20030085618 discloses a method for producing a wire harness by using a Mentor Graphics program. The computer-graphics aided three-dimensional interactive application E3D (Extreme 3 Dimension) is modelled by using the data of the circuit drawing. The wire harness is produced by outputting a production order from the UNIX through the use of the form board data, and turning over it to the workshop. These inventions assume that the data being acquisitioned is error free.

U.S. Pat. No. 6,791,336 B2, earlier published as application no US 2003/0006779 A1 discloses apparatus and method for validating wiring diagrams, specifically wiring diagram manuals and creates wires list. The wiring diagrams are validated by stimulating voltage signal. The apparatus can also be used as a troubleshooting tool for detecting shorts in a physical wiring harness. Also disclosed is a method of generating wiring diagram based on validation checks and records. This invention is, therefore, essentially around correctness of schematics and correspondingly of the physical wiring.

As can be understood by persons skilled in the art, discrete inventions are known which facilitate wire harness document preparation and wire harness manufacture there from.

In reality, there are various design stages for creating wire harness document preparation and importantly, several design personnel are involved in developing various fragments, which are eventually collated to create wire harness document and which in turn is used to aid manufacture of wire harness. Typical fragments are circuit diagrams and wiring harness drawings in two dimensional forms and three dimensional wiring harness models, encompassing information from Component Database. It is important that there are no mismatches between these fragments. Currently, such a validation is carried out by skilled designers who can understand and analyse circuit schematic, Wire harness Drawing as well as three dimensional assemblies. Even then, the process is largely person dependent, thus unstructured, besides manual, and no comprehensive system exists to manage such an inter-dimensional validation. Analogous to such situations is the laying out of pipes and tubes in the same manner as wire harness.

Our system and method addresses this lacuna inventively.

OBJECTIVE OF THE INVENTION

The objective is to invent a method for validating two dimensional circuit schematic, two dimensional wire harness drawing and three dimensional wire harness assembly with respect to one another and Component database without requiring the skills of designers of circuit schematic, wire harness drawing and or three dimensional wire harness assembly.

The objective is also to invent a system for validating contents of various two dimensional wire harness design outputs with respect to one another.

Another objective is to invent a system for validating various two dimensional wire harness design outputs with respect to three dimensional wire harness design output.

Yet another objective is to invent a system for validating attributes of various components in the two as well as three dimensional wire harness design outputs with respect to component database.

Yet another objective is to invent a validation system which significantly enhances the quality of wire harness design output.

Yet another objective is to invent a validation system and method which significantly reduces the overall cost and time of manufacture of wire harness due to eliminating potential waste in subsequent corrections due to errors in wire harness design outputs.

Yet another objective is to invent a validation system which significantly saves time of the wire harness output designers by eliminating manual validation.

Yet another objective is to invent a method and a system which can cater to validation of electrical as well as non-electrical wire harness.

SUMMARY OF INVENTION

The present invention is a system and method for multilateral validation of wire harness design outputs, comprising the steps of:
a. alphanumeric validation of a first two dimensional output with respect to a component database;
b. alphanumeric validation of a second two dimensional output with respect to the component database;
c. alphanumeric validation between the first two dimensional output and the second two dimensional output;
d. intrinsic validation within a three dimensional output;
e. alphanumeric validation of the three dimensional output with respect to the component database; and
f. alphanumeric validation of a validated second two dimensional output with respect to the three dimensional output, The mismatches found consequent to validations, which include repeats and miss-outs, are reported as output reports in prescribed format as errors.

A two dimensional output and a three dimensional output is generally generated on altogether different and unconnected software platforms. Present invention recognises that corresponding such ECAD as well as MCAD outputs, here, a two dimensional wire harness drawing, a two dimensional circuit design, as well as a three dimensional Routing & Packaging assembly, the present software suites correspondingly create a BDF containing details of non-graphical matter. The present invention makes use of them for alphanumeric comparison and alphanumeric validation. A method as per present invention is to compare and validate such alphanumeric data, interpret and create actionable report, by multilateral validation around following Wire Harness Design Outputs:
(1) a wiring harness drawing,
(2) a circuit schematic design, and
(3) a routing and packaging assembly
which are designed independently, having common information, and such common information needs to match exactly.

The common information is contained in a plurality of BDFs.

The method follows following sequence of validations:
1. Alphanumeric validation of a BDF of Circuit Schematic design with respect to the Component Database, taking the Component Database as reference.
2. Alphanumeric validation of a BDF of Wire harness drawing, with respect to the BDF of the Circuit Schematic design, where neither of the two BDFs is considered as reference.
   The method is equally applicable for more than two BDFs and in such a case, the validation is multi-directional or multilateral.
3. Intrinsic validation of a BDF of routing and packaging assembly, also termed as 3D CAD, within a three-dimensional software suite.
4. Alphanumeric validation of the BDF of Wire Harness drawing, with respect to the BDF of Routing & Packaging Assembly.

The outcome of the method is an error free BDF of wire harness drawing, and consequently the wire harness drawing which is eventually used for manufacture of wire harness.

A system for a multilateral validation of wire harness design outputs, as per the method of present invention is in the form of a computer program residing on a computer processor, the computer processor being part of a computer system, comprising of one or more computer readable storage media having computer-executable instructions of a PLM embodied thereon, wherein the computer program, plugged in the PLM, when invoked, causes, as per user interface selection, execution of validation as described below. The system generates a plurality of Output reports—mismatch reports which includes miss-outs and repeats, count reports; and facilitates validation of Output reports.

As shown in FIG. 1 and FIG. 6, the system (600) is inputted and uses BDFs and after validation brings out mismatches which include miss-outs and repeats in the understandable format like Microsoft Excel, pdf, HTML, CSV, notepad or such equivalent formats, termed as Output Reports (680).

The system is named "EQWIC" for describing present invention. The "EQWIC" (610) is in the form of a "plug-in" which can be installed in any known PLM tool.

On invoking the inventive system, termed as "EQWIC", said validations are:
(1) Two dimensional to two dimensional, abbreviated as 2D-2D
(2) Two dimensional to three dimensional, abbreviated as 2D-3D A set of Output reports are generated from each validation.

On executing the 2D-2D validation, two kinds of validations are performed:
(a) Wire Harness DSI with respect to Component Database
(b) Wire Harness DSI with respect to Circuit Schematic DSI The method is equally applicable for more than two BDFs and in such a case, the validation is multi-directional or multilateral.

Mismatches are reported as Output report. For wires, mismatches in size, TO information, FROM information also reported.

2D-3D validation involves the BDF of the Routing & packaging assembly and of the Wire Harness DSI, and the Component database; and is performed on validated Wire Harness DSI, that is, after performing and duly correcting the Wire Harness DSI as per Output reports of 2D-2D validation.

The validations performed under 2D-3D validation are for all components, and also combination check, Incomplete Connection check and mass property check.

Output validation signifies updating of correction in the plug-in instead of running the plug-in several times. Based on reports generated by the plug-in, the designer(s) is required to revisit and revise any of the Circuit Diagram, Harness Design or Harness assembly so as to eliminate the reported mismatch which includes miss-out or repeat. The plug-in provides for a version wise Output Validation, using option code. Version wise output validation means that the user selects a version of the equipment and enters the update.

The term multilateral validation includes alphanumeric validation and intrinsic validation and at times mentioned interchangeably with validation, whether unilateral or bilateral.

The system as per present invention is ancillary to complex PLMs, two-dimensional and three-dimensional software suites, which are hugely complex software suites supplementing human capabilities, which our plug-in further complements by providing a validation link between them by using BDFs generated by them.

Our inventive system for multilateral validation of wire harness design outputs, which is a "plug-in" on a PLM, is installable on specific hardware and or workstations which support industrial PLM tools, example—workstation with 64 bit operating system, NVIDIA Quadro 4000 2 GB GFX Special, and upwards.

DESCRIPTION OF DRAWINGS

FIG. 3 and FIG. 3A show an illustrative Component database.

FIG. 4A shows an illustrative background database file in .DSI format, corresponding to the two dimensional wire harness drawing.

FIG. 5A shows an illustrative background database file in .DSI format, corresponding to the two-dimensional circuit schematic design.

FIG. 9A shows an illustrative Output report of Wire Harness validation with respect to Component database, as generated by the system.

FIG. 10A shows an illustrative Output report of Wire Harness validation with respect to Circuit Schematic DSI, as generated by the system.

FIG. 11 and FIG. 11A show illustrative reports of validation of Wire Harness DSI with respect to Circuit Schematic DSI, specific to validation of wires, as generated by the system.

DETAILED DESCRIPTION OF THE INVENTION

Figure 1:
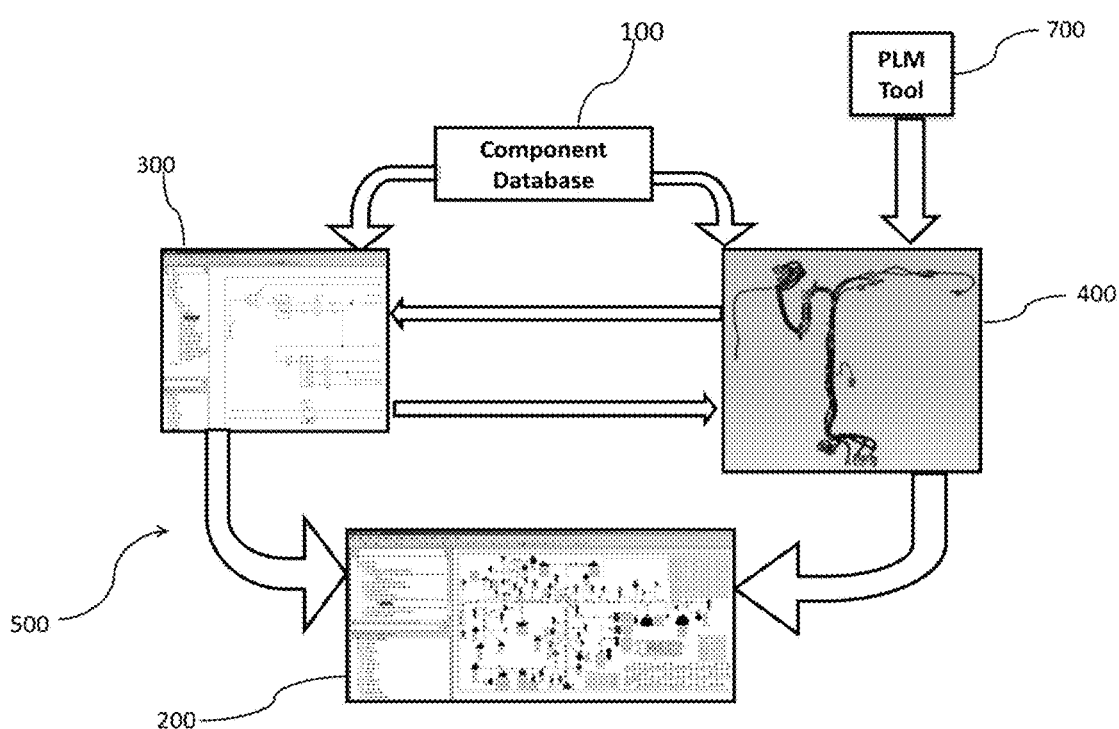
FIG. 1 shows a method for a multilateral validation system encompassing a two-dimensional wiring harness drawing, a two-dimensional circuit schematic design and a three dimensional routing and packaging assembly along with Component Database.

In the foregoing description, following terms mean as follows—

Wire harness—a bunch of wires, whether conventional or optical or any other kind, capable of carrying electrical power and or signals, and the bunch may also include fluid tubes, capable of carrying any fluid; the ends of wires and tubes may be prepared so as to be directly connectable to intended device. In other words, the term "wire harness" is not restricted to electrical wires only.

Wire—Conventional wire or optical wire or any other kind of physical conductor, also non-conductor and or hollow/solid tubes.

Components—All materials required and used in a wire harness is termed as components. Components non-exhaustively include wire, connector, clip, terminal, splice, grommet.

Component database, also called CDS—Component database, also termed as CDS, is a data file containing identification parameters, termed as attributes, of all the components which are required in the manufacture of a wire harness. Such a Component database is usually proprietary of organizations. Attributes illustratively described in present invention are (a) Part number—unique alphanumeric identification assigned to every component viz. Wire, Connector, Terminal, Grommet, tie, clip, splice, etc.

(b) Instance name—unique alphanumeric identification assigned to every component for each specific use in a wire harness.

Every component has a unique part number but has multiple instance name, each corresponding to a specific use. For example, in a vehicle, a particular connector may be used for both left head lamp as well as right head lamp in a wire harness. The part number shall be the same for both instances of use, while the instance name shall be different.

Component database at times also contains identification numbers of sub-suppliers, and any other attribute which the owner organisation requires for efficient manufacturing related processing.

Routing & Packaging Assembly, Also Called 3D CAD—

Routing and packaging assembly, also called 3D CAD, is a three dimensional model of a wire harness output with dimensional details. Thus, it is a three dimensional output. Such three dimensional model provides space requirement related information related to an equipment, for example, a vehicle, where the manufactured wire harness is required to be installed. The three dimensional model contains bill of material of all components used therein. This is a mechanical computer aided design and is therefore also termed as MCAD. For the purpose of describing present innovation, reference is made to a known three-dimensional modelling computer aided design software suite CATIA V5 from Dassault Systems.

Circuit Schematic Design—

Circuit Schematic Design is a Logical Connectivity diagram created on a software platform, which represents the connectivity of devices to one another. For the purpose of describing the present invention, reference is made to Vesys Design, Capital Logic of Mentor Graphics; used for creating Circuit Schematic Diagram.

Wiring Harness Drawing—

Wiring Harness Drawing is a two-dimensional drawing created on a software platform for Wiring Harness Manufacturing. Wiring Harness Drawing represents the Form board Layout of Wiring Harness to be manufactured. For the purpose of describing the present invention, reference is made to VeSys Harness, Capital Harness XC of Mentor Graphics.

Circuit Schematic Design and Wiring Harness Drawing are referred to as electrical computer aided designs (ECAD). Both of them are two dimensional outputs. The Circuit Schematic Design is referred to as a first two dimensional output and the Wiring harness Drawing is referred to as a second two dimensional output.

Background Data File—

Background data file, abbreviated as BDF, is an alphanumeric data file corresponding to contents of two dimensional Circuit Schematic design and two dimensional wire harness drawing. Files with ".DSI" extension, where DSI means "Design System Interface", ".XML" extension, where XML stands for "Extensible Mark-up Language" are non-exhaustive illustrations of such alphanumeric data files. Such files get created in the background as the known software suites are used to generate Circuit Schematic Design, Wire harness drawing and other such output, generable from specific software suite. Such file formats are used for transferring data across various software. Such files are NOT friendly for direct use by humans.

BDF of three dimensional model is also accessible from the MCAD file by application program interface, by which the BDF is taken from the downloaded Routing & Packaging Assembly.

Circuit DSI, Also Called CKT DSI—

A circuit DSI, also referred to as CKT DSI, is a kind of a BDF that contains all the extracted data from Circuit Schematic which needs to be validated. XML file format is also alternatively used. A Circuit DSI file corresponds to an electrical computer aided design and is therefore also termed an ECAD.

Wiring Harness DSI, Also WH DSI—

A wiring harness DSI, also referred to as WH DSI file is a kind of a BDF that contains all the extracted data from Wiring Harness Drawing which needs to be validated. XML file format is also alternatively used. It is also termed as an ECAD.

Option Code—

Option code is a code assigned to a specific feature in a wire harness. Illustratively, a specific device in equipment, say a vehicle, shall have a group of wires. Such devices are generally optional or specific to a particular version of the equipment. Codes, like –N, –Q, assigned to identify such a specific feature is Option Code.

The two dimensional outputs and three dimensional outputs referred to in this invention are essentially developed using different known software platforms/suites and are also commonly referred to as computer aided designs.

The invention shall now be described with the help of drawings and illustrations, which should be construed merely for description and not for limiting the invention. One skilled in the art will understand that the present invention may have additional embodiments, or that the present invention may be practiced without several of the details described in the following description.

The present invention is a system and method for multilateral validation of wire harness design outputs, comprising the steps of:

a. alphanumeric validation of a first two dimensional output with respect to a component database (100);
b. alphanumeric validation of a second two dimensional output with respect to the component database (100);
c. alphanumeric validation between the first two dimensional output and the second two dimensional output;
d. intrinsic validation within a three dimensional output;
e. alphanumeric validation of the three dimensional output with respect to the component database (100); and
f. alphanumeric validation of a validated second two dimensional output with respect to the three dimensional output, The mismatches found consequent to validations, which include repeats and miss-outs, are reported as output reports in prescribed format as errors.

A two dimensional output and a three dimensional output is generally generated on altogether different and unconnected software platforms. Furthermore, designers need altogether different skill sets to work on a two dimensional software platform or a three dimensional software platform and in all likelihood are two different persons. A two dimensional as well as a three dimensional computer aided design output is not comparable statistically and is only suited for visual checks with thorough content understanding. Validation of such outputs requires skill more or less of the same order as that of the designer. Present invention recognises that corresponding to ECAD as well as MCAD outputs, here, a two dimensional wire harness drawing, a two dimensional circuit design, as well as a three dimensional Routing & Packaging assembly, the present software suites correspondingly create a BDF containing details of non-graphical matter. The present invention makes use of them for alphanumeric comparison and alphanumeric validation.

A method as per present invention is to compare and validate such alphanumeric data, interpret and create actionable report.

As pictorially shown in FIG. 1, pictures well recognizable by persons well versed with the art, the method (500) as per present invention is a multilateral validation around following Wire Harness Design Outputs:

(1) a wiring harness drawing (200),
(2) a circuit schematic design (300) and
(3) a routing and packaging assembly (400)

which are designed independently, having common information, and such common information needs to match exactly.

The common information non-exhaustively comprises of
Inputs decided by designer, example—length of wires, selection of components, number of components
Attributes (110) from Component Database (100)

The common information is contained in a plurality of BDFs (210, 310, 410). The wiring harness drawing (200) has a BDF (210), the circuit schematic design (300) has a BDF (310) and the Routing and Packaging Assembly (400) has a BDF (410). Attributes (110) from Component database (100) are contained in the circuit schematic (300), wire harness drawing (200) as well as in the routing and packaging (400). Wire length information from routing & packaging (400) is validated in the circuit schematic (300).

A plurality of mismatch and thus error crops in due to different personnel creating and due to the fact that in reality each output has hundreds of attributes (110) and wire harness related information, like length, size and kind of wires.

Figure 1A:
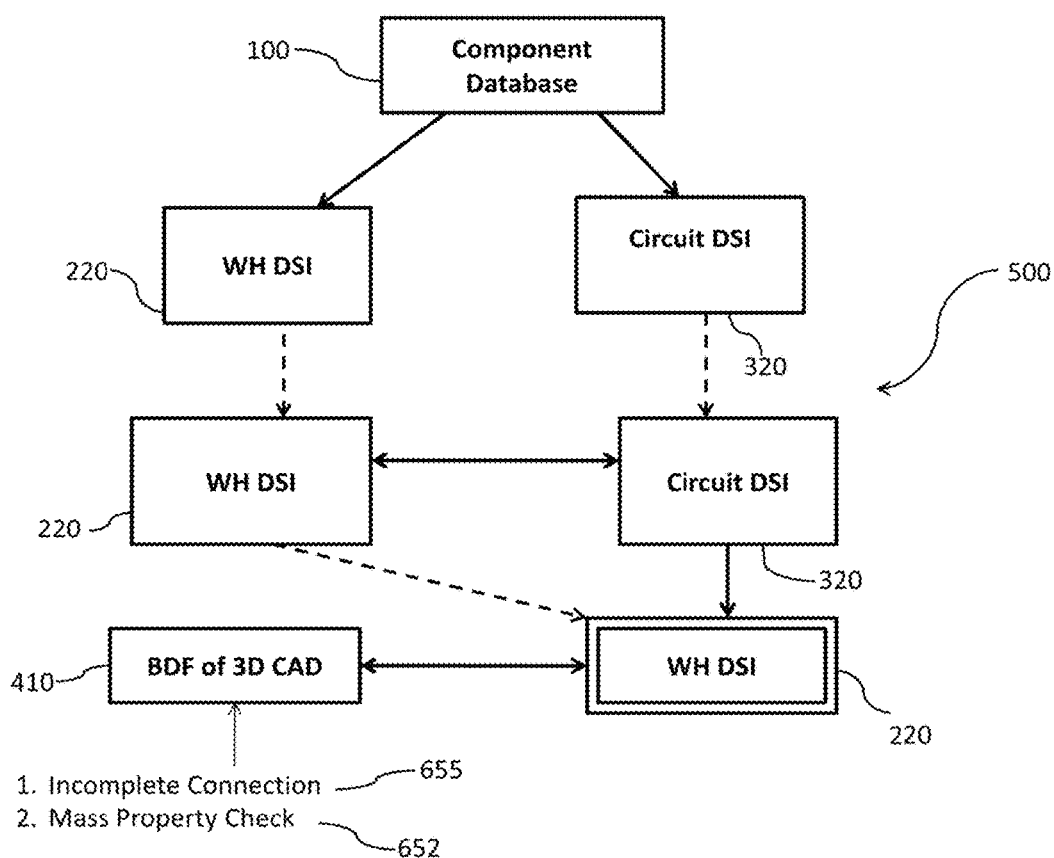
FIG. 1A describes sequence of validation of BDFs of various two dimensional and three dimensional outputs. The terms used in the figure are defined in the detailed description.

As shown in FIG. 1 and FIG. 1A, the method (500) as per present invention follows following sequence of validations:
1. Alphanumeric validation of a BDF (310) of Circuit Schematic design (300), here CKT DSI (320), with respect to the Component Database (100), taking the Component Database (100) as reference. Thus all mismatches including repeats and miss-outs are w.r.t. the Component Database (100). Such a validation is one direction or unilateral.
2. Alphanumeric validation of a BDF (210) of Wire harness drawing (200), here WH DSI (220), with respect to the BDF (310) of the Circuit Schematic design (300), here CKT DSI (320), where neither of the two BDFs (210, 310) is considered as reference. Thus all mismatches including repeats and miss-outs are with respect to both BDFs (210, 310). Such a validation is bi-directional or bilateral. The method is equally applicable for more than two BDFs and in such a case, the validation is multi-directional or multilateral.
3. Intrinsic validation of a BDF (410) of routing and packaging assembly (400), also termed as 3D CAD (400) within a three-dimensional software suite.
4. Alphanumeric validation of the BDF (210) of Wire Harness drawing (200), here WH BDI (220), with respect to the BDF (410) of Routing & Packaging Assembly (400).

The outcome of the method as per present invention is the error free BDF (210) of wire harness drawing (200), here WH DSI (220), and consequently the wire harness drawing (200), which is eventually used for manufacture of wire harness.

As is easily relatable by the definitions given before, WH DSI (220) is a specific form of BDF (210) of the Wire Harness Diagram (200), the "DSI" being a file extension of a kind. Likewise, CKT DSI (320) is a specific form of BDF (310) of the Circuit Schematic Design (300), the "DSI" being a file extension of a kind.

A system for a multilateral validation of wire harness design outputs, as per the method (500) of present invention is in the form of a computer program residing on a computer processor, the computer processor being part of a computer system, comprising of one or more computer readable storage media having computer-executable instructions of a product life cycle management, abbreviated as a PLM (700) embodied thereon, wherein the computer program, plugged in the PLM, when invoked, causes, as per user interface selection, execution of validation as described below. The validation has innumerable numbers of possible combinations, depending on contents and attributes (110) of the component database (100), which varies from organisation to organisation. The validation is, thus, a custom-built validation, unilateral and or bilateral. The system (600) generates a plurality of Output reports—mismatch reports which includes miss-outs and repeats, count reports; and facilitates validation of Output reports.

Figure 6:
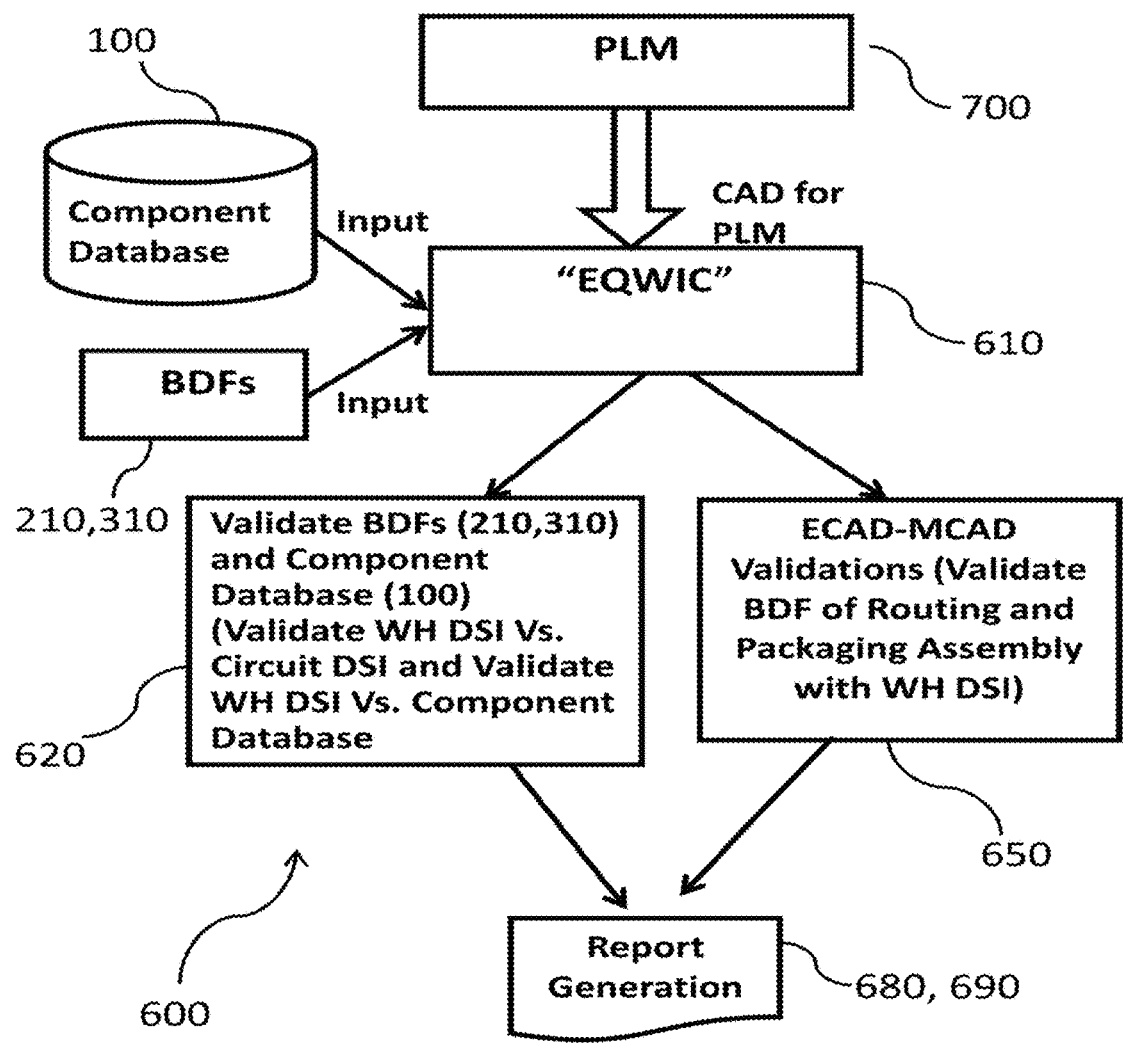
FIG. 6 shows a higher level flow diagram of the system corresponding to the method as per present invention.

As shown in FIG. 1 and FIG. 6, the system (600) is inputted and uses BDFs (210, 310, 410) corresponding to Circuit schematic design (300), wire harness drawing (200) and routing & packaging assembly (400) respectively, along with the Component Database (100); and after validation brings out mismatches which include miss-outs and repeats in the understandable format like Microsoft Excel, pdf, HTML, CSV, notepad or such equivalent formats, termed as Output Reports (680).

The system (600) is named "EQWIC" (610) for describing present invention and therefore "EQWIC" (610) means the system (600) as per present invention throughout this description and in accompanying drawings. "EQWIC" (610) is operable on a computer processor. The computer processor causes the "EQWIC" (610) to execute the validation as per method of present invention.

The "EQWIC" (610) is in the form of a "plug-in" which can be installed in any known Product Life Cycle Management (PLM) tool (700). For the purpose of describing here, the illustration is done using "TEAMCENTER", which is a known Siemens PLM Software.

Figure 2:
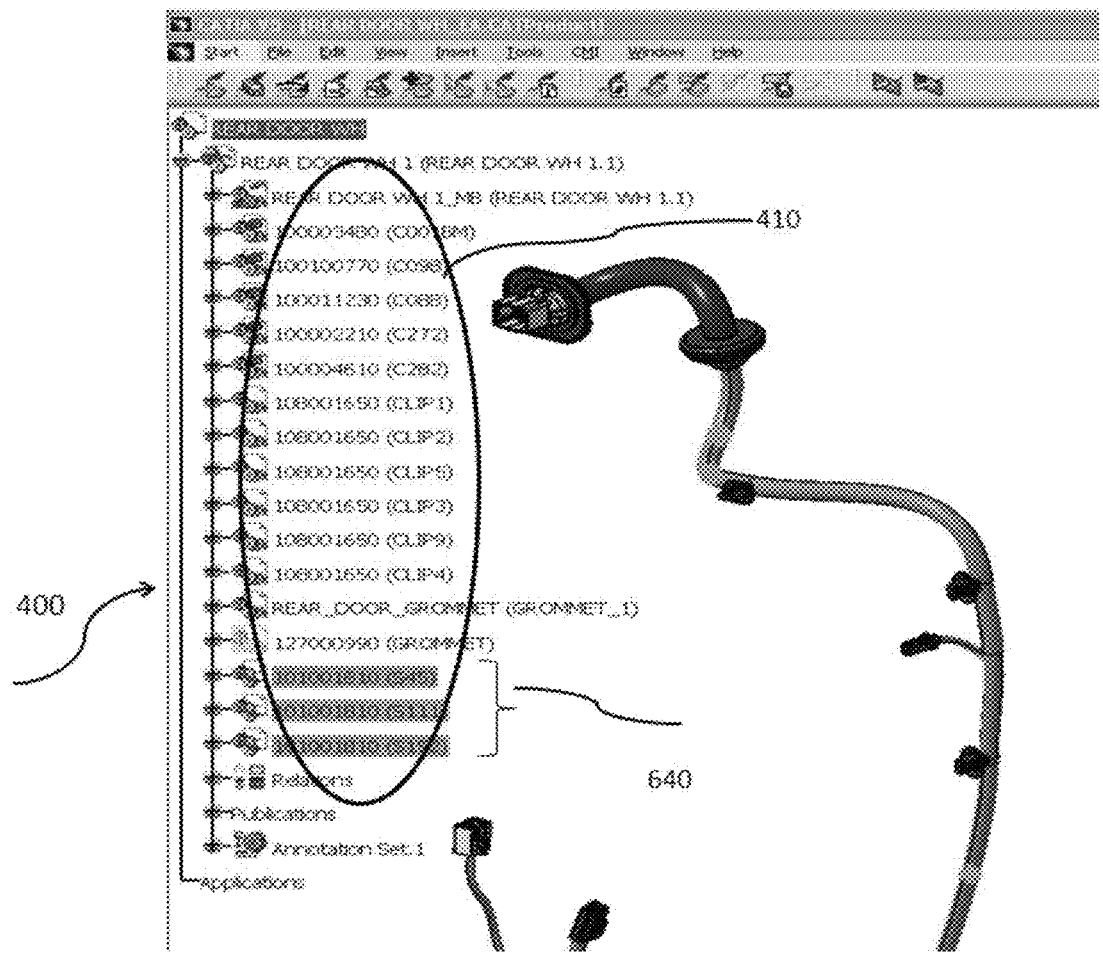
FIG. 2 shows an illustrative routing and packaging assembly showing the three-dimensional aspect of such assembly, along with corresponding attributes.
Figure 4:
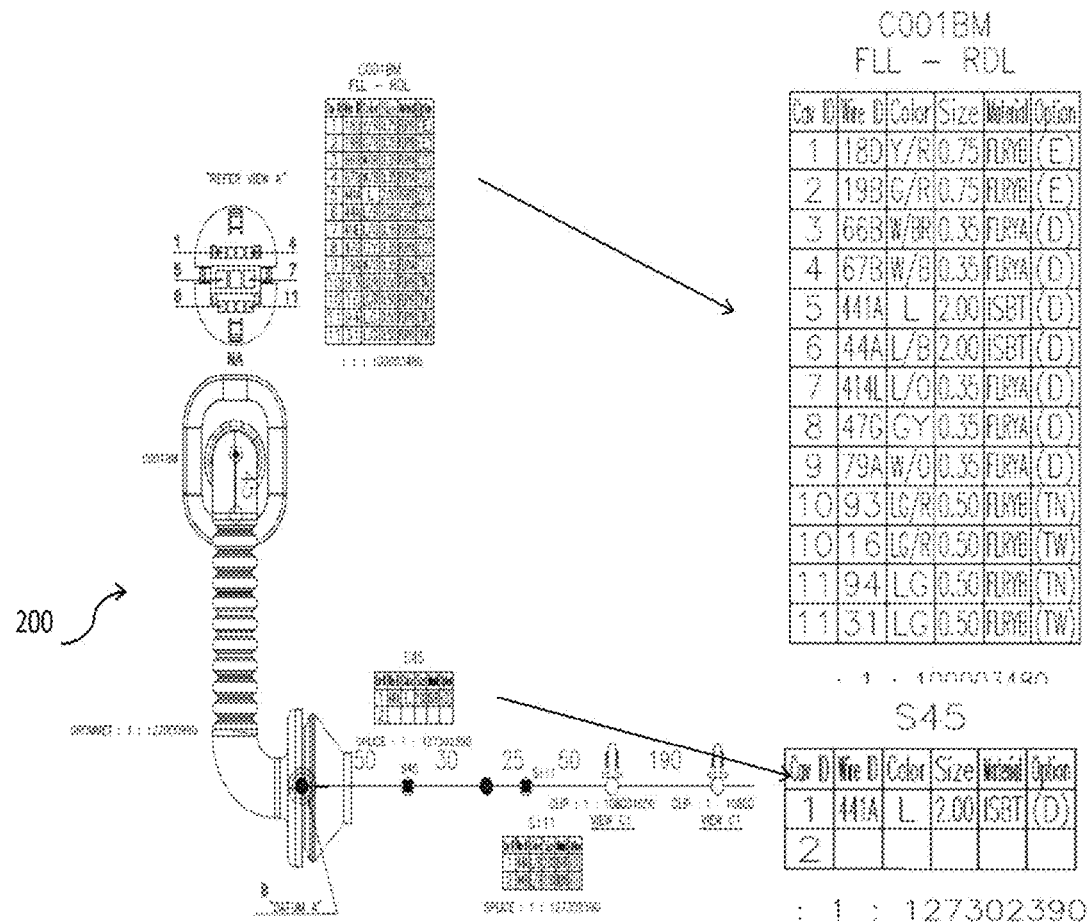
FIG. 4 shows an illustrative two-dimensional Wire harness drawing

A hypothetical and oversimplified illustrative wire harness is created to explain the inventive steps of the method (500) and the system (600) named "EQWIC" (610). FIG. 2 shows a computer screen image of the illustrative Routing & Packaging Assembly (400), developed on a known three dimensional computer aided design software suite CATIA V5. Alongside is also seen the corresponding BDF (410). Illustratively highlighted are part numbers (111) and Instance names (112) of splice (640). FIG. 3A and FIG. 3 show an illustrative Component Database (100), of a plurality of wire (631) and all other components viz. connector (638), grommet (639), splice (640), etc. . . . . FIG. 4 shows a 2D drawing of the Wire harness design (200) and FIG. 4A shows corresponding BDF (210), termed as "Wire harness DSI" or WH DSI (220) file in the description. Likewise, FIG. 5 shows a 2D drawing of the Connection schematic design (300), with some of the attributes (110) identified, and FIG. 5A shows corresponding BDF (310) termed as "Circuit DSI" or CKT DSI (320) file in the description.

Figure 5:
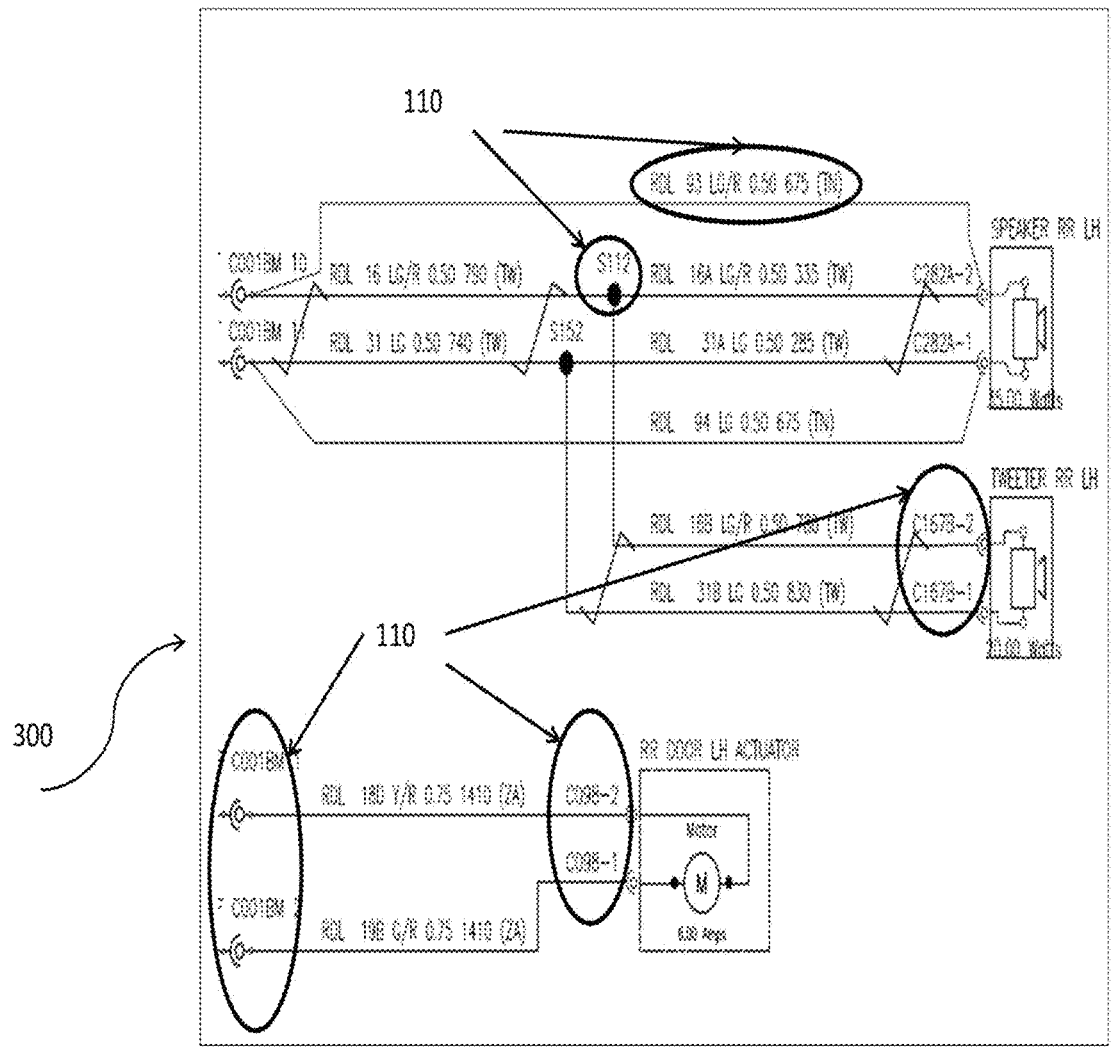
FIG. 5 shows an illustrative two-dimensional circuit schematic design.

Person skilled in the art can appreciate the intense technical contents of FIG. 2, FIG. 4 and FIG. 5. Generally different designers work on them. Even if same designer could work and generate them, the sheer volume of contents and information makes the work error prone, which in manufacturing stage would mean missing wire, missing or wrong connectors, short length of wire, and the whole wire harness, which ultimately means the entire equipment is rendered non-usable. Published information on recall of automobiles due to erroneous wire harness is well known to persons in the related profession.

While a lot of contents are common amongst these two dimensional and three dimensional outputs, it is impossible to identify them without complete understanding of the electrical and mechanical aspects of these two dimensional and three dimensional outputs. On the other hand, the content of FIG. 4A and FIG. 5A, while virtually meaningless when seen superficially, contain all technical aspects. The method and system disclosed as per present invention makes it possible to compare and validate with minimal skill and time, and which is the essence of this inventive method and system.

As shown by a higher level flow diagram in FIG. 6, on invoking the inventive system (600), termed as "EQWIC"

(610) and which is plugged in a product life cycle management tool (700), here, TEAMCENTER, said validations are:
(1) Two dimensional to two dimensional, abbreviated as 2D-2D (620)
(2) Two dimensional to three dimensional, abbreviated as 2D-3D (650)

A set of Output reports (680, 690) are generated from each validation.

Figure 6A:
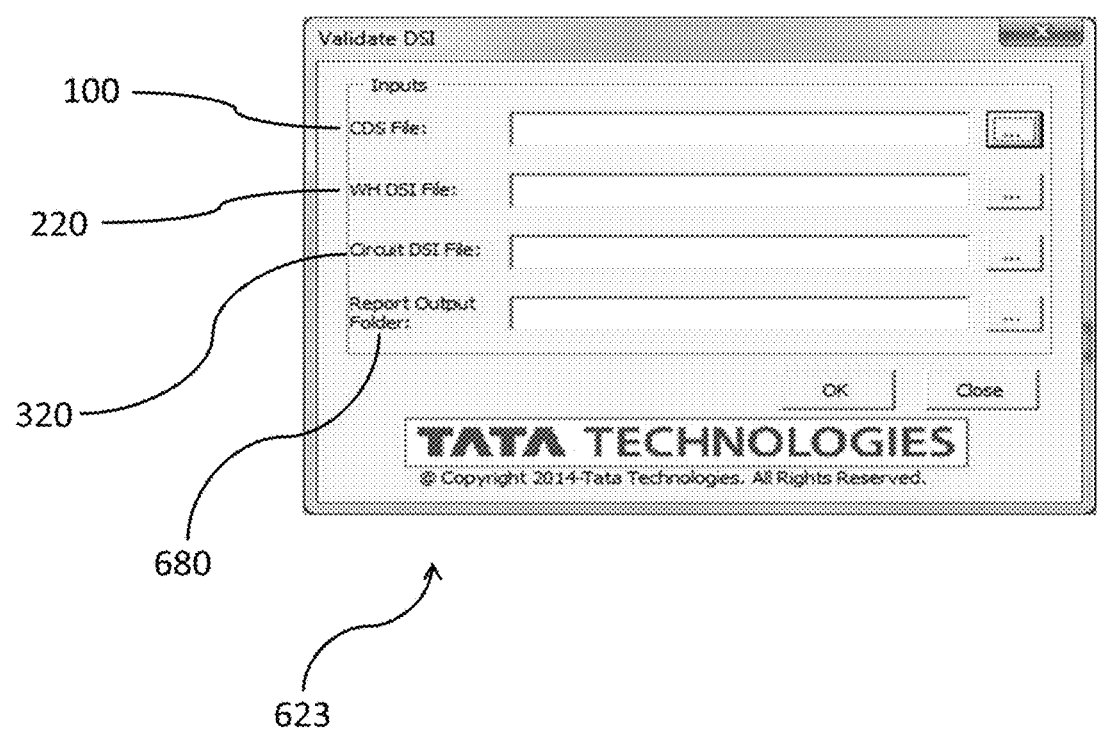
FIG. 6A shows a screen of computer program wherein the user needs to input the WH DSI, Circuit DSI and CDS file, along with a desired location of Outputs

On selecting the option of 2D-2D (620) validation, the "EQWIC" (610) prompts for following user inputs as shown in FIG. 6A:
- The Component Database or CDS (100),
- The BDF (310) of Circuit Schematic Design (300) i.e. Circuit DSI (320),
- The BDF (210) of Wire Harness drawing (200) i.e. Wire harness DSI (220), and
- A desired location and name of Output file.

Figure 7:
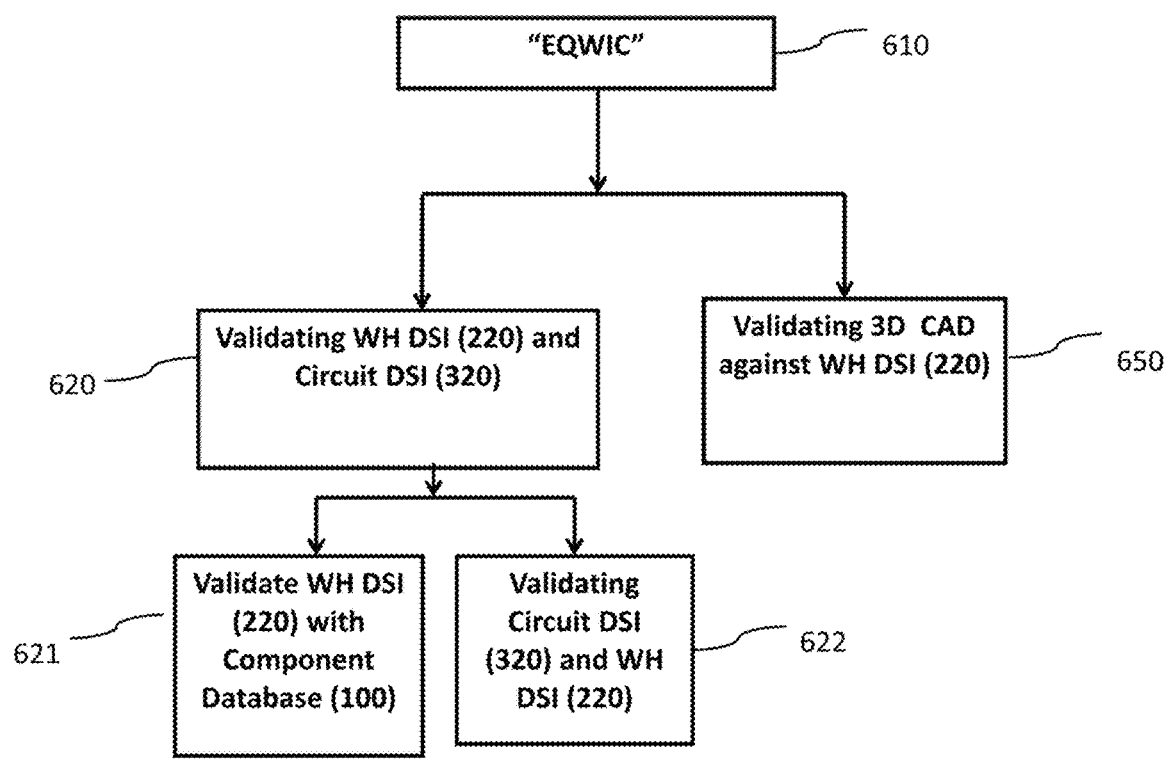
FIG. 7 and FIG. 8 show steps of two-dimensional to two-dimensional validation.
Figure 8:
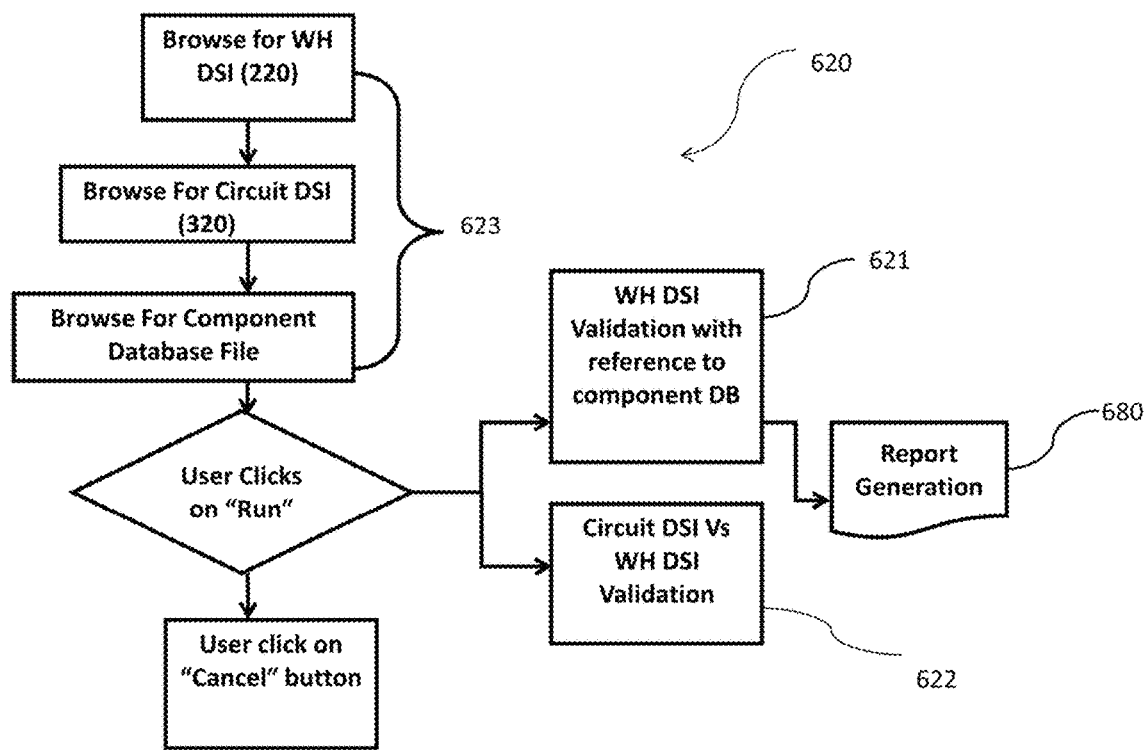

As shown in FIGS. 7 and 8, on executing the 2D-2D (620) validation, two kinds of validations are performed:
a) Wire Harness DSI with respect to Component Database (621)—BDF (210) of Wire Harness Drawing (200) with respect to Component Database (100), taking Component Database (100) is reference. Thus all mismatches including repeats and miss-outs are w.r.t. Component Database (100). Such a validation is unidirectional or unilateral.
b) Wire Harness DSI with respect to Circuit Schematic DSI (622)—BDF (210) of Wire harness drawing (200) with respect to BDF (310) of Circuit Schematic design (300) where neither BDF (210, 310) is considered as reference. Thus all mismatches including repeats and miss-outs are with respect to both BDFs (210, 310). Such a validation is bi-directional or bilateral.
The method is equally applicable for more than two BDFs and in such a case, the validation is multi-directional or multilateral.

Figure 9:
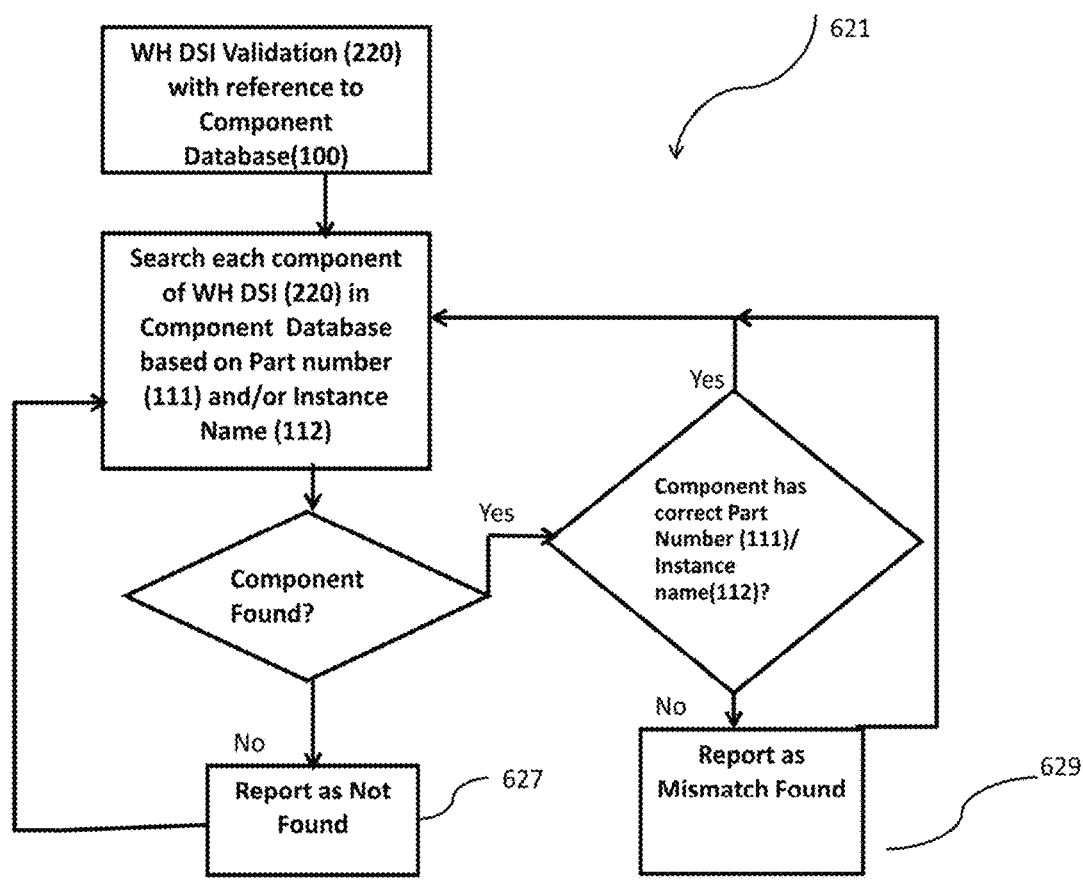
FIG. 9 shows steps of Wire harness DSI validation with respect to Component Database.
Figure 13:
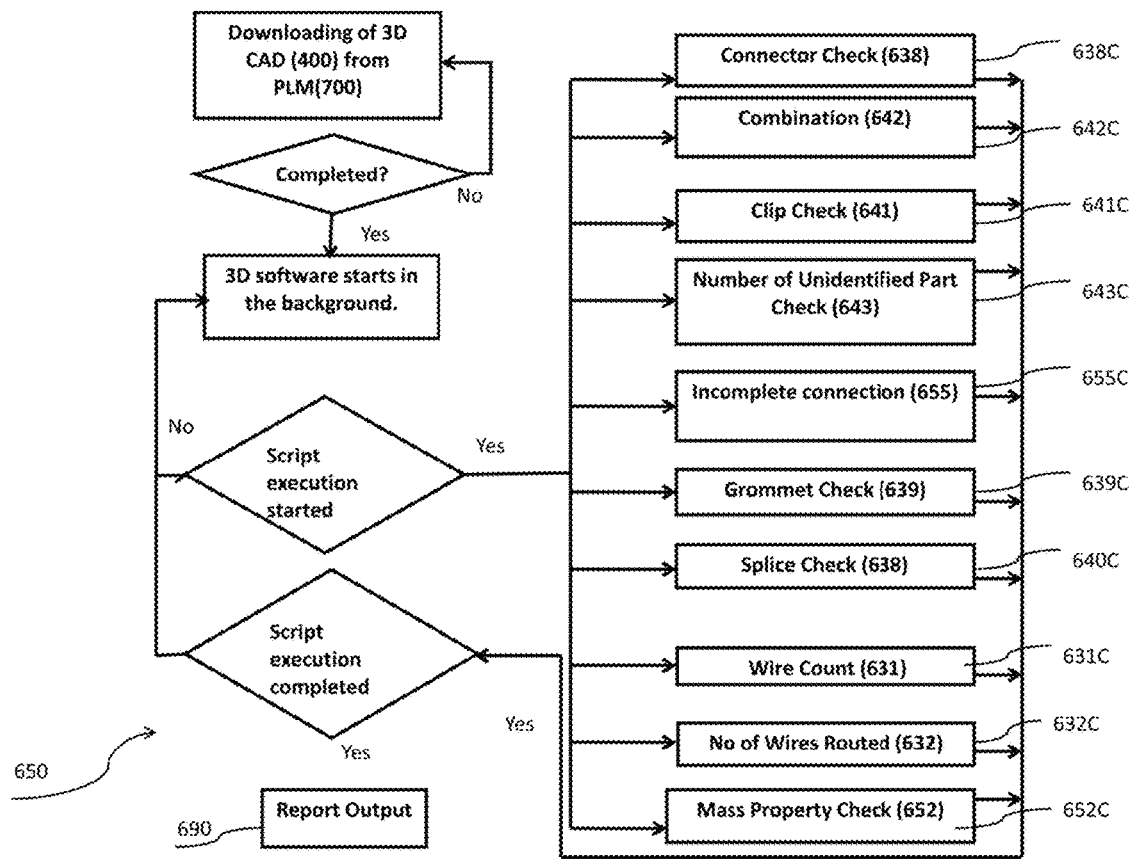
FIG. 13 shows flow diagram of checks and validations performed under 2D-3D validation.

As shown in FIG. 9, seen together with FIG. 1A and FIG. 13, in Wire harness DSI validation with respect to Component Database (621), all the components (630), namely, Wires (631), Splices (640), Grommets (639), Clips (641), Connectors (638) are validated for attributes (110), namely, part number (111) and instance names (112). Mismatched or and missing part number (111) and or instance name (112) in Wire Harness DSI (220) with respect to Component database (100) are reported. Part number (111) and instance name (112) for each component (630) in the Wire Harness DSI (220) is searched and compared in Component Database (100). Miss-outs (627) as well as mismatches (629) are reported in Output report (680), as shown in FIG. 9A.

Figure 10:
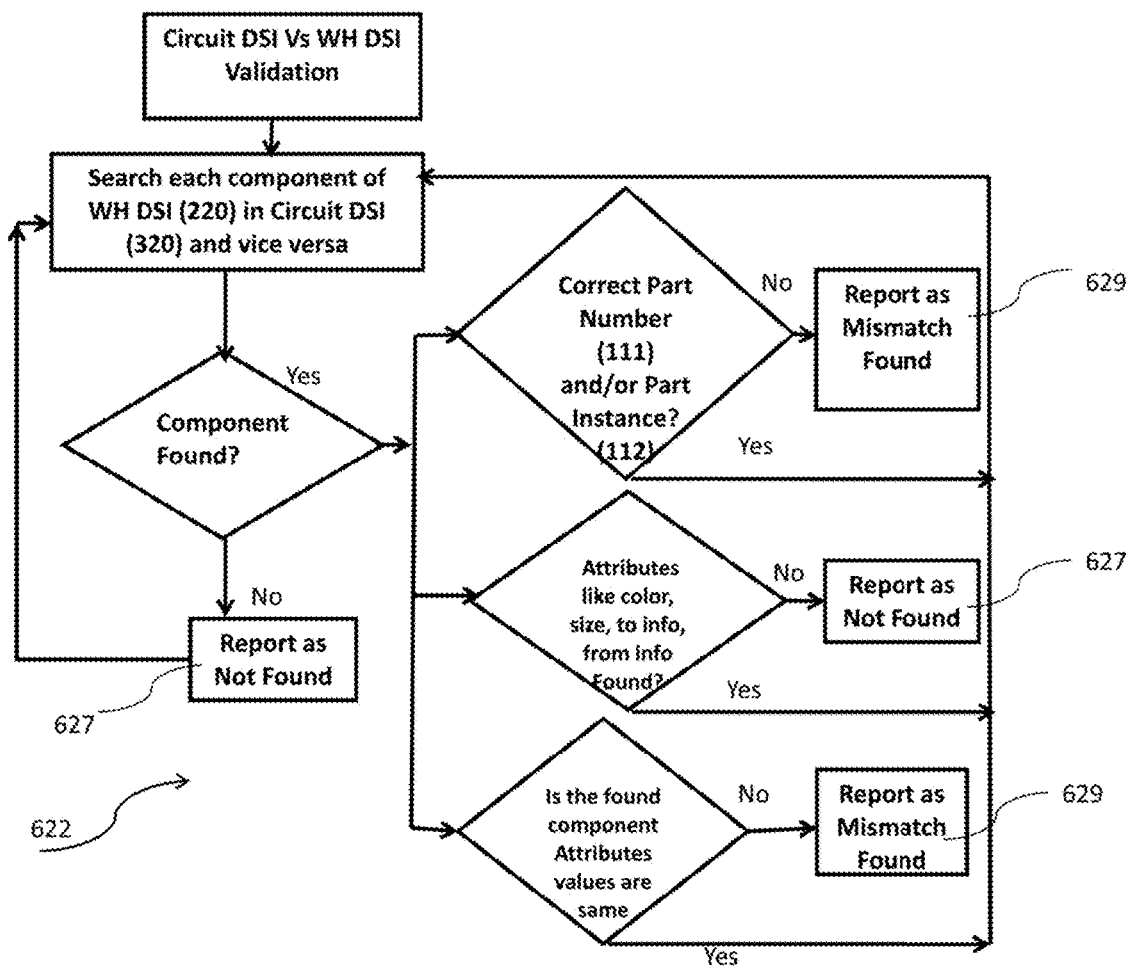
FIG. 10 shows steps of Wire Harness DSI validation with respect to Circuit Schematic DSI.

As shown in FIG. 10, in Wire Harness DSI (220) validation with respect to Circuit Schematic DSI (320), all components are validated for part number (111) and or instance name (112).

Following is reported as Output report (680), as shown in FIG. 10A:
- Mismatch Report (629) of part number (111) or and Instance name (112) in Wire Harness DSI (220) with respect to Circuit DSI
- Component count (628)
- Component present in Wire Harness DSI but absent in Circuit DSI (629)
- Component present in Circuit DSI but absent in Wire Harness DSI (629)

Figure 11A:
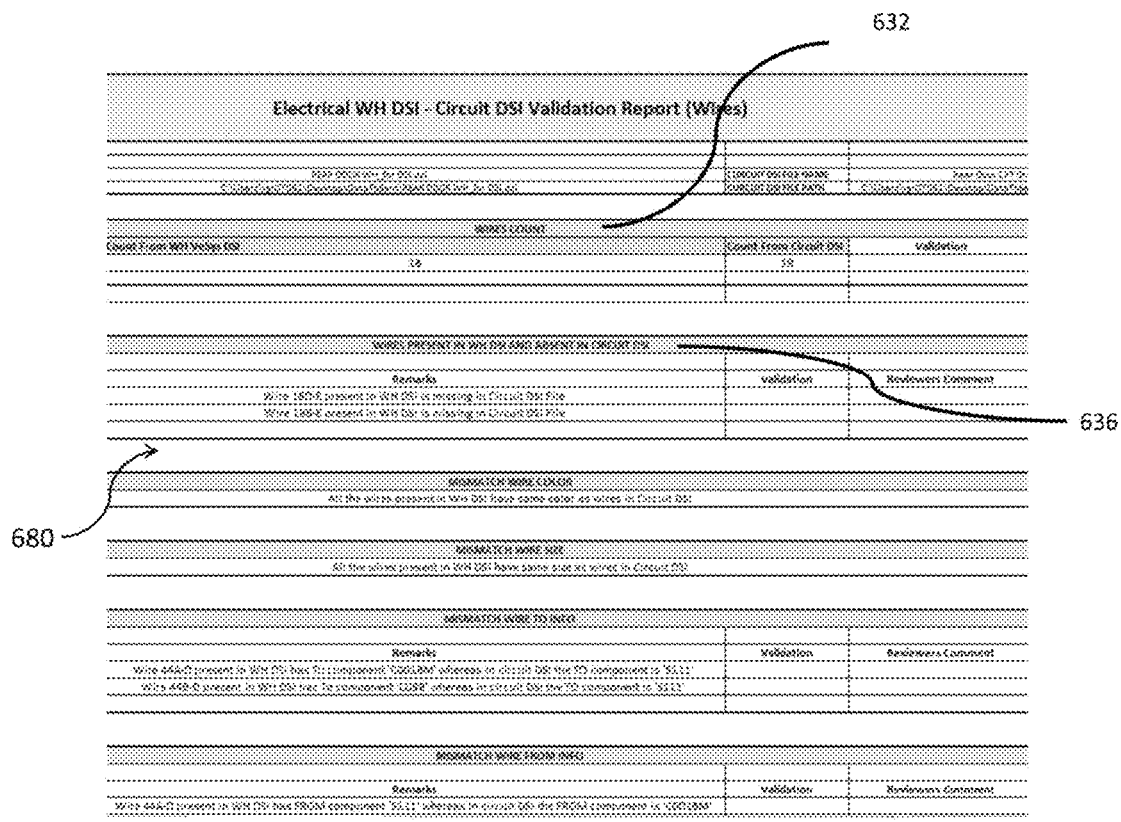

For wires, following are also reported as shown in FIGS. 11 and 11A:
- Mismatch in count (632)
- Mismatch in size (633)
- Mismatch in TO information (634)
- Mismatch in FROM information (635)
- Wire absent in Circuit DSI and present in WH DSI (636)

2D-3D validation involves the BDF (410) of the Routing & packaging assembly (400), Wire Harness DSI (220) of the Wire Harness Diagram (200) and Component database (100); and is performed on validated Wire Harness DSI (220), that is, after performing and duly correcting the Wire Harness DSI (220) as per Output reports (680) of 2D-2D validation.

Figure 12:
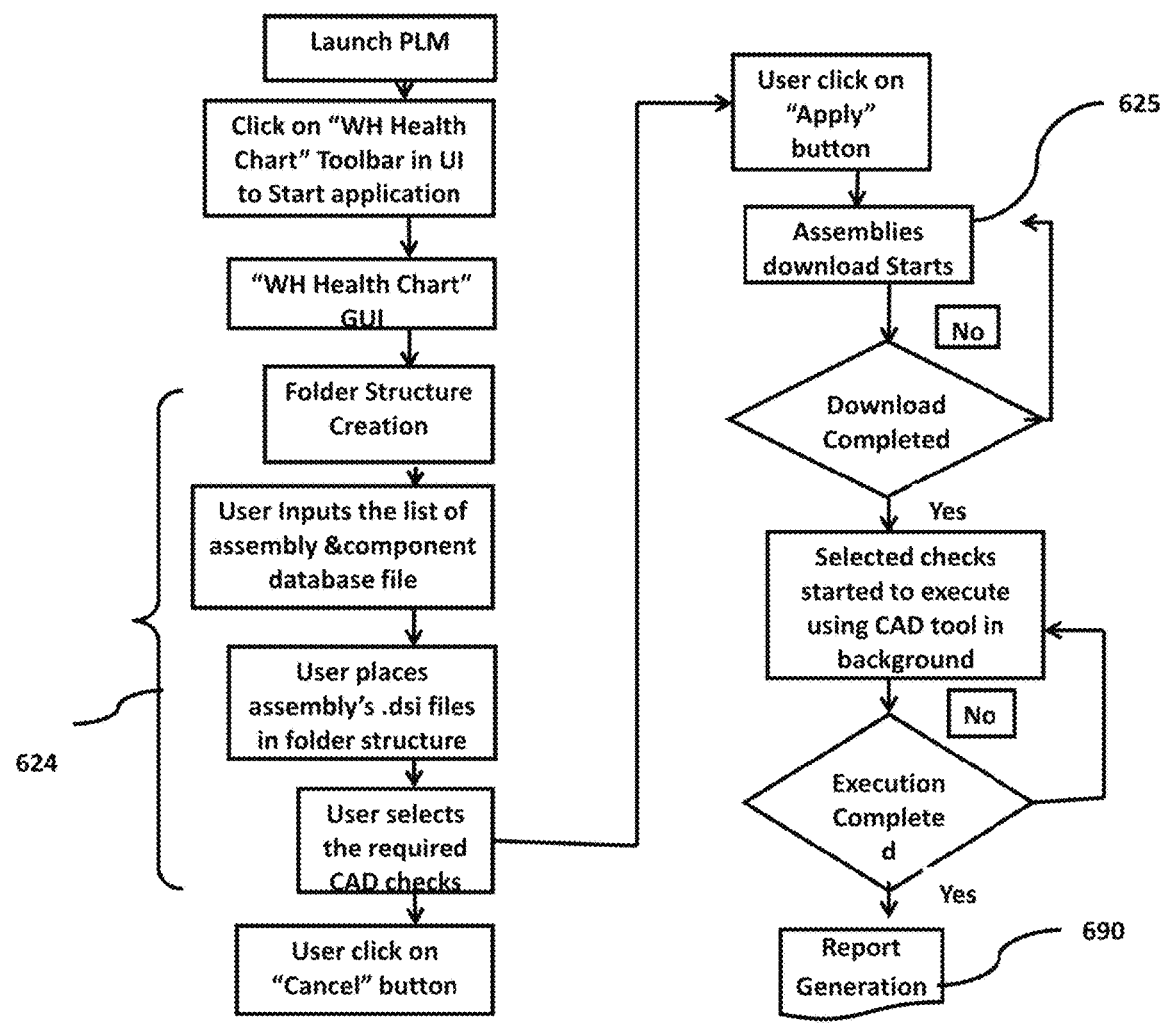
FIG. 12 shows steps for starting a Two-dimensional-Three-dimensional validation.
Figure 12A:
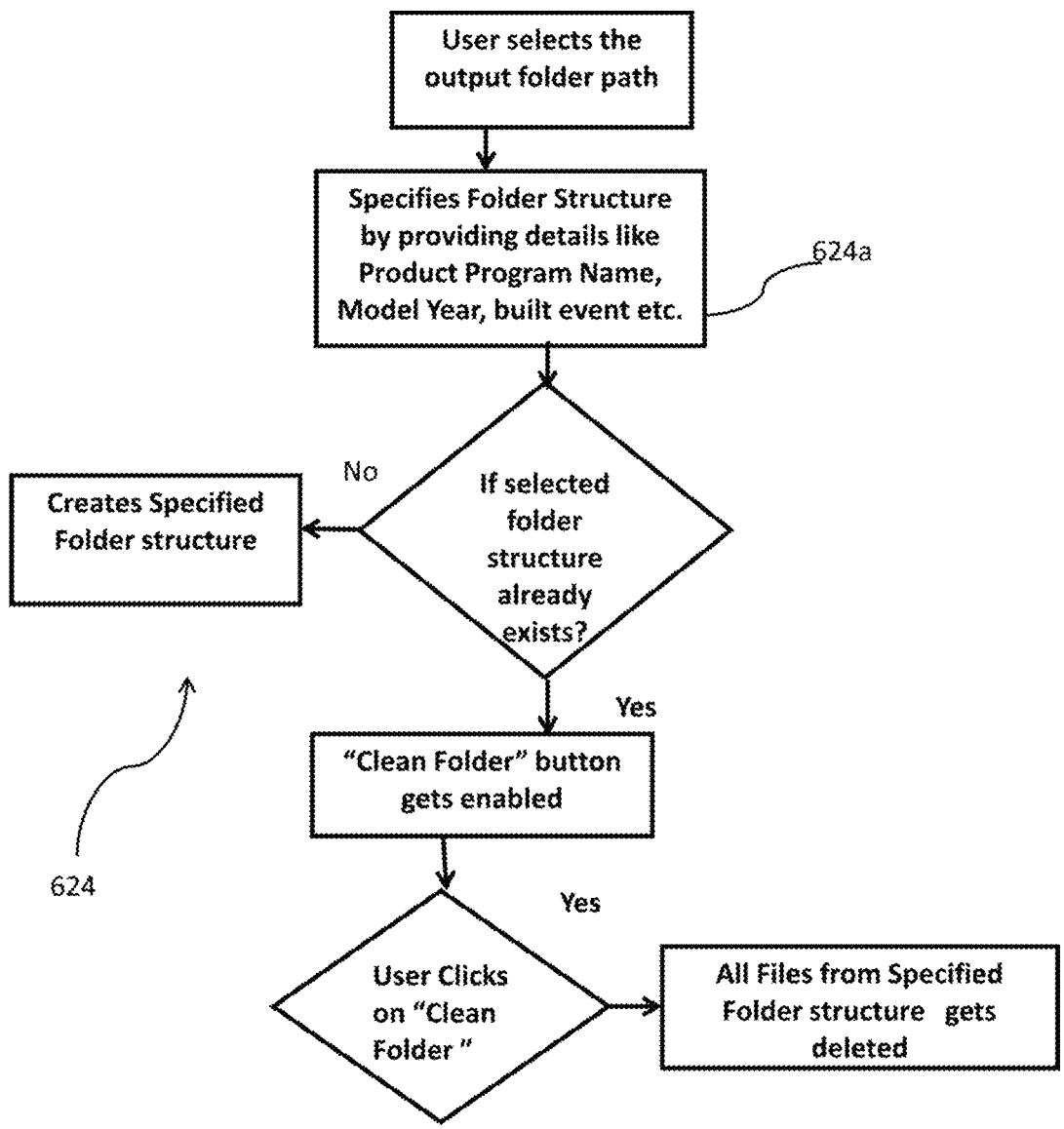
FIG. 12A shows flow diagram for Folder structure creation.

As shown by flow diagram in FIG. 12, the 2D-3D validation involves Folder structure creation (624) and downloading (625) of three dimensional Routing & packaging assembly (400). Folder structure creation (624) implies user selecting and inputting the required WH DSI (220) and CDS (100) files under desired file names. As shown in flow diagram in FIG. 12A, Folder structure creation thus also includes providing details of the project, that is, Product or Programme Name for which the validation is undertaken (624a). This step is primarily for Identification and tracking of the project, since an organization normally has several ongoing projects.

Figure 12B:
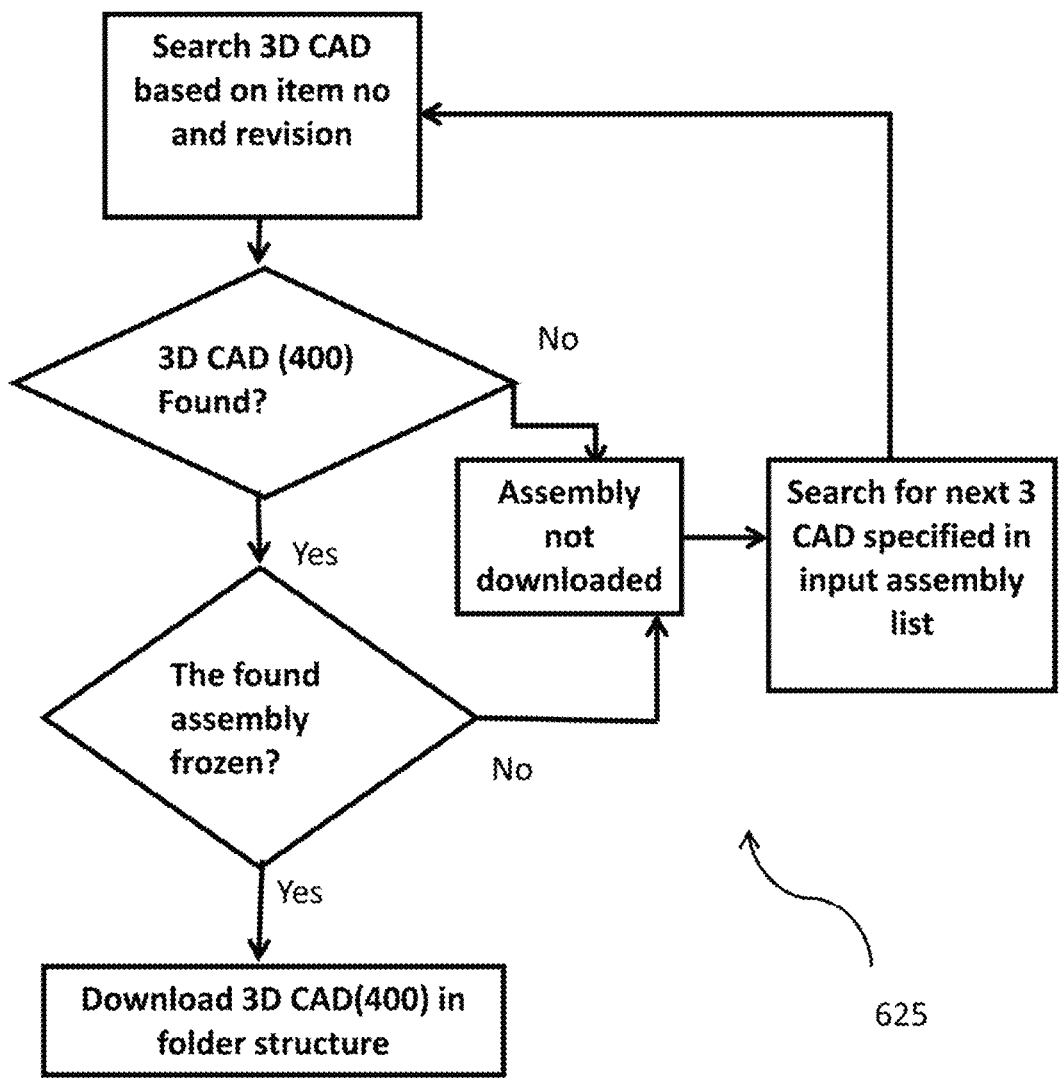
FIG. 12B shows steps of downloading the three dimensional Routing and Packaging assembly on which two-dimensional-three-dimensional validation is to be performed.

Downloading (625) pertains to the Routing & Packaging Assembly (400). FIG. 12B shows the steps of downloading the three dimensional Routing and Packaging assembly (400) on which 2D-3D (650) validation needs to be performed.

FIG. 13 shows the checks and validations performed under 2D-3D validation (650). Following is the non-exhaustive checks and validations performed by "EQWIC" (610):
1. Connector check (638C)
2. Combination check (642C)
3. Clip check (641C)
4. Unidentified parts check (643C)
5. Incomplete Connection check (655C)
6. Grommet check (639C)
7. Splice check (640C)
8. Wire check (631C)
9. No of wires routed (632C)
10. Mass property check (652C)

Combination (642) implies more than one attribute (110). Apropos, Combination Check (642C) is an illustration of custom-built validation, wherein more than one attributes is checked as a combination and mismatch, which includes miss-out and repeat, is reported as Output (690). Combination check (642C) is applied as per specific requirement for any or all component (630), either independently or as part of any check.

Figure 13A:
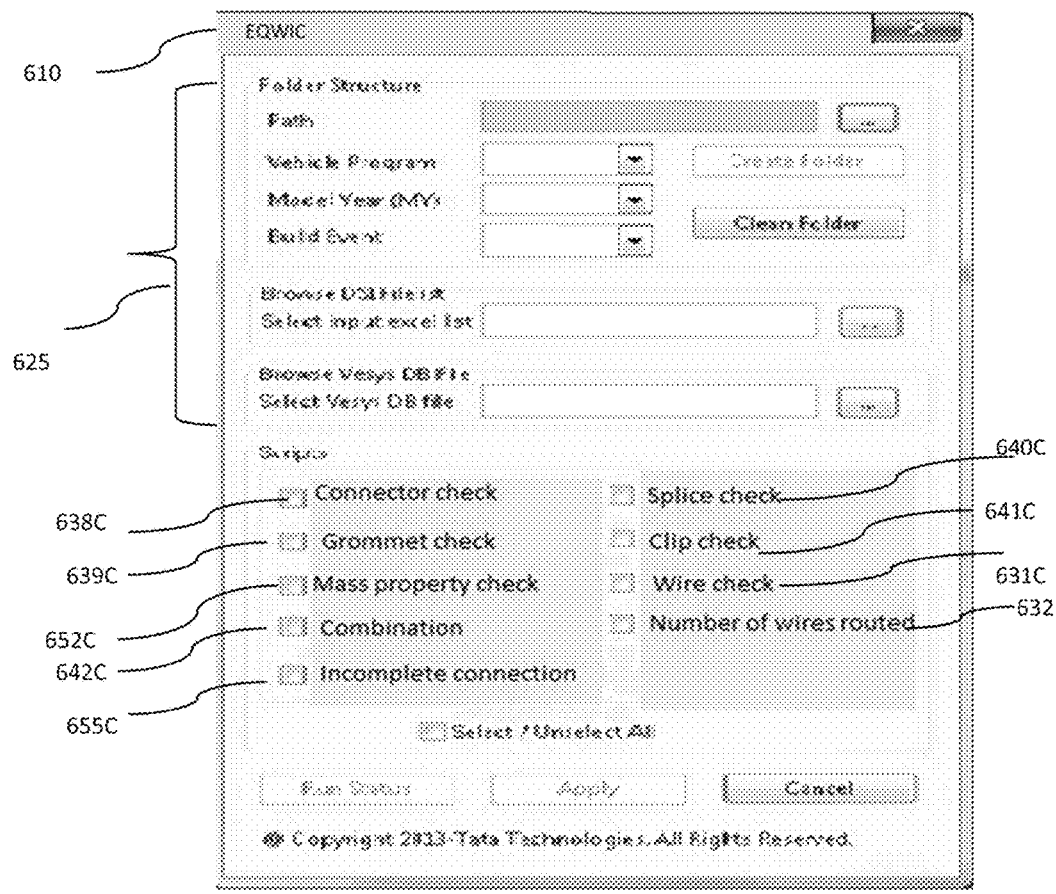
FIG. 13A shows a screen of computer program wherein the user needs to input the Folder structure and validation checks required.

Any or all of the validation/check can be selected by user selection, as illustrated by FIG. 13A.

Figure 14:
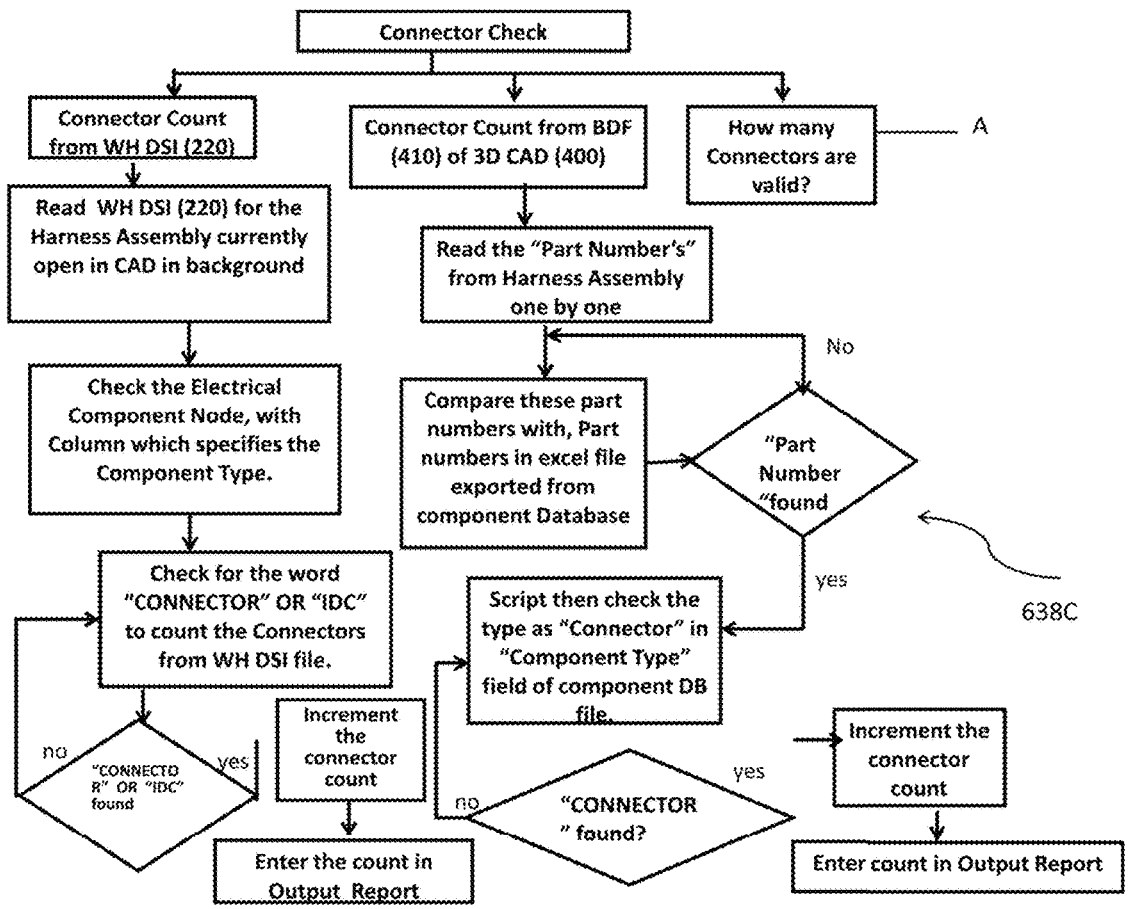
FIG. 14, FIG. 14A and FIG. 14B show steps of connector check.
Figure 14A:
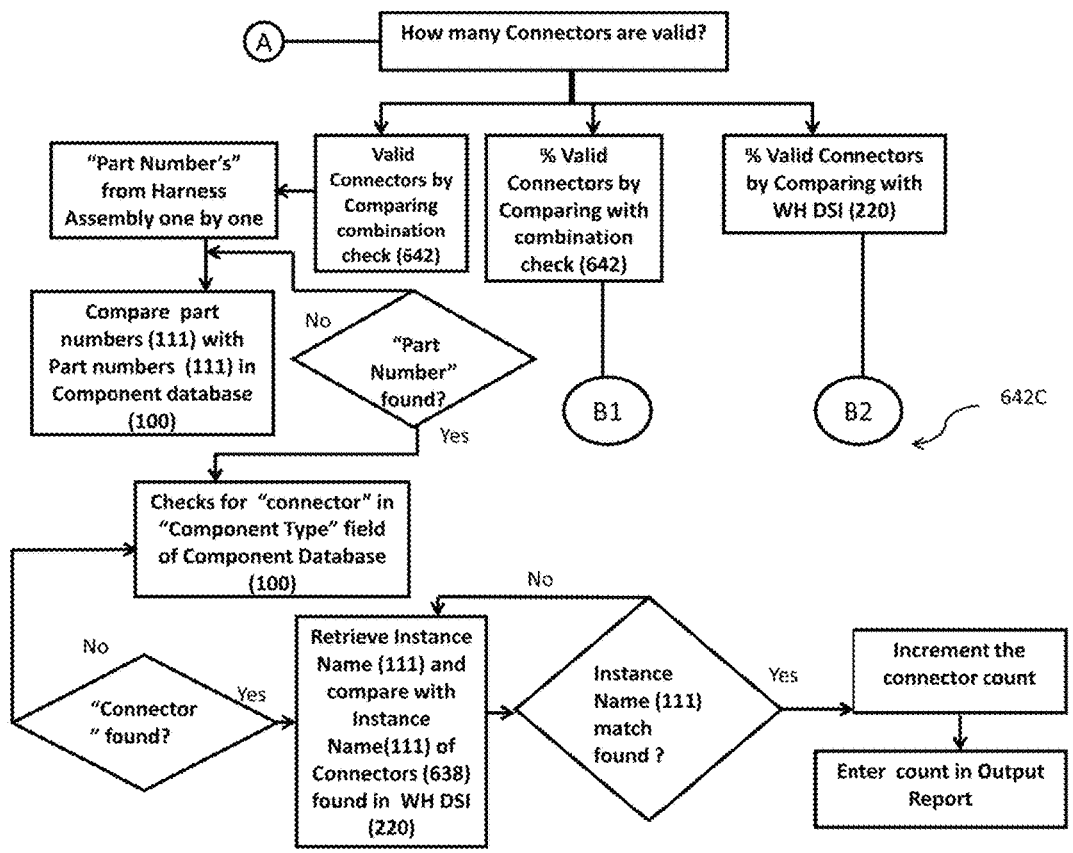
Figure 14B:
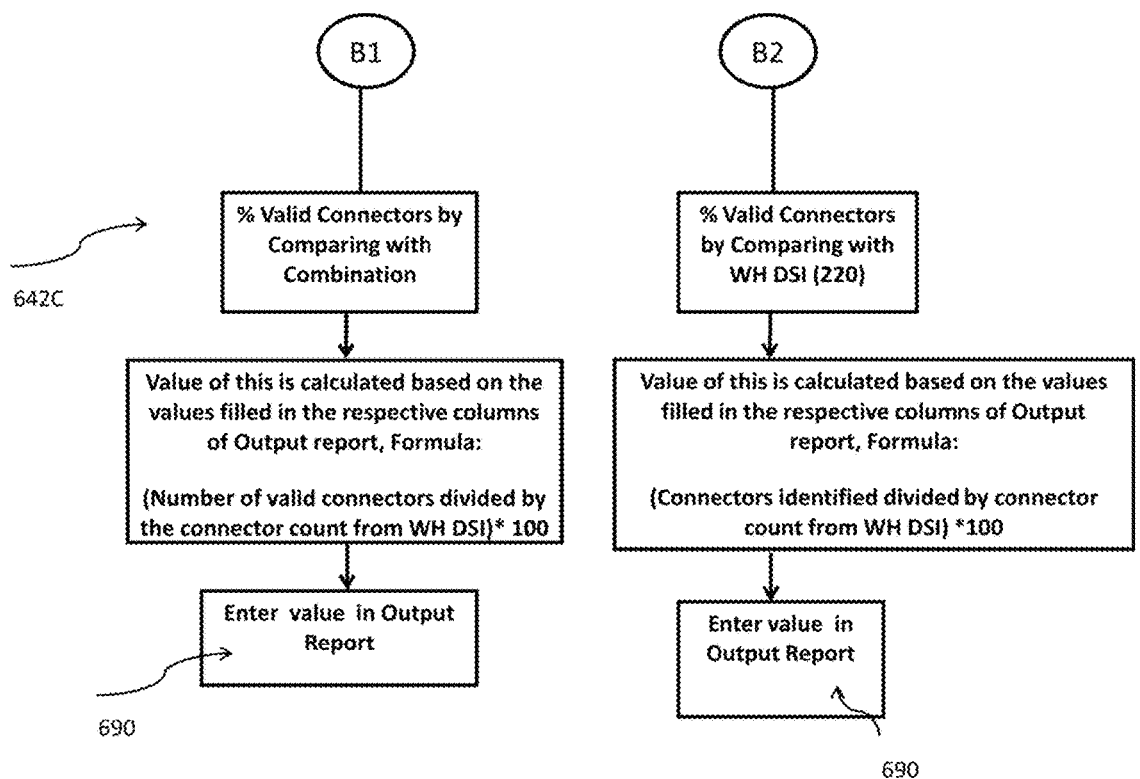

FIG. 14, 14A, 14B shows steps of connector check (638C). Essentially, the connectors (638)
a) Are counted in the Wire harness DSI (220)
b) Are counted in the BDF (410) of Routing and Packaging assembly (400)
c) Are validated in the BDF (410) of Routing and Packaging assembly (400) with respect to Component database (100) for a combination check (642C) of Part number (111) and Instance name (112).
d) Count as found from Wire Harness DSI (220), and as found from BDF (410) of Routing and Packaging assembly (400) is reported as output.

Figure 15:
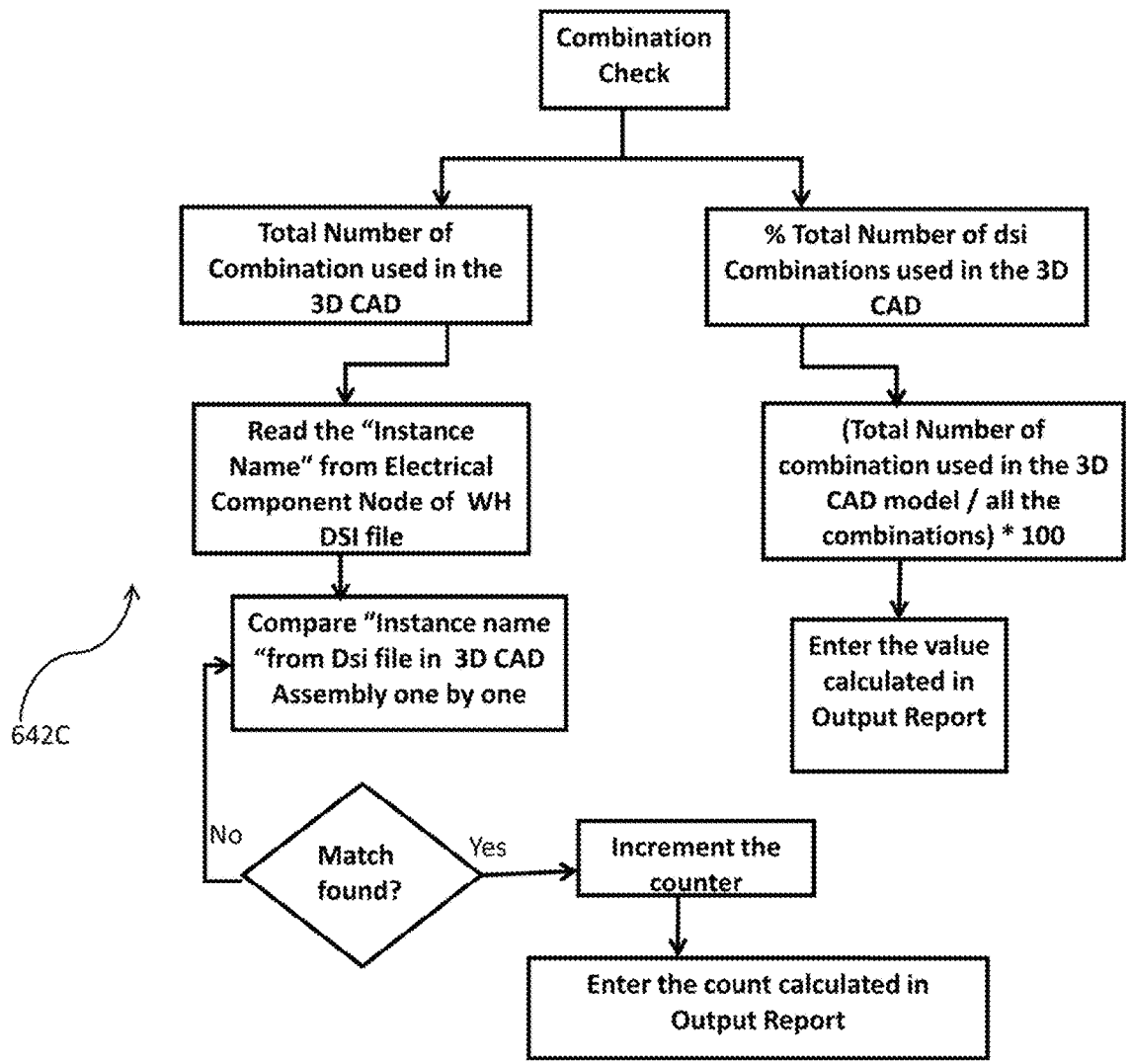
FIG. 15 shows steps for Combination check.

FIG. 15 shows steps for Combination check (642C). Under this check, a combination of two or more attributes from BDF (410) of Routing and Packaging assembly is validated with respect to corresponding combination in WH DSI (220). In the illustration, combination of Part number (111) and Instance name (112) is shown, which however, is merely illustration and not a limitation. Count is reported.

Figure 16:
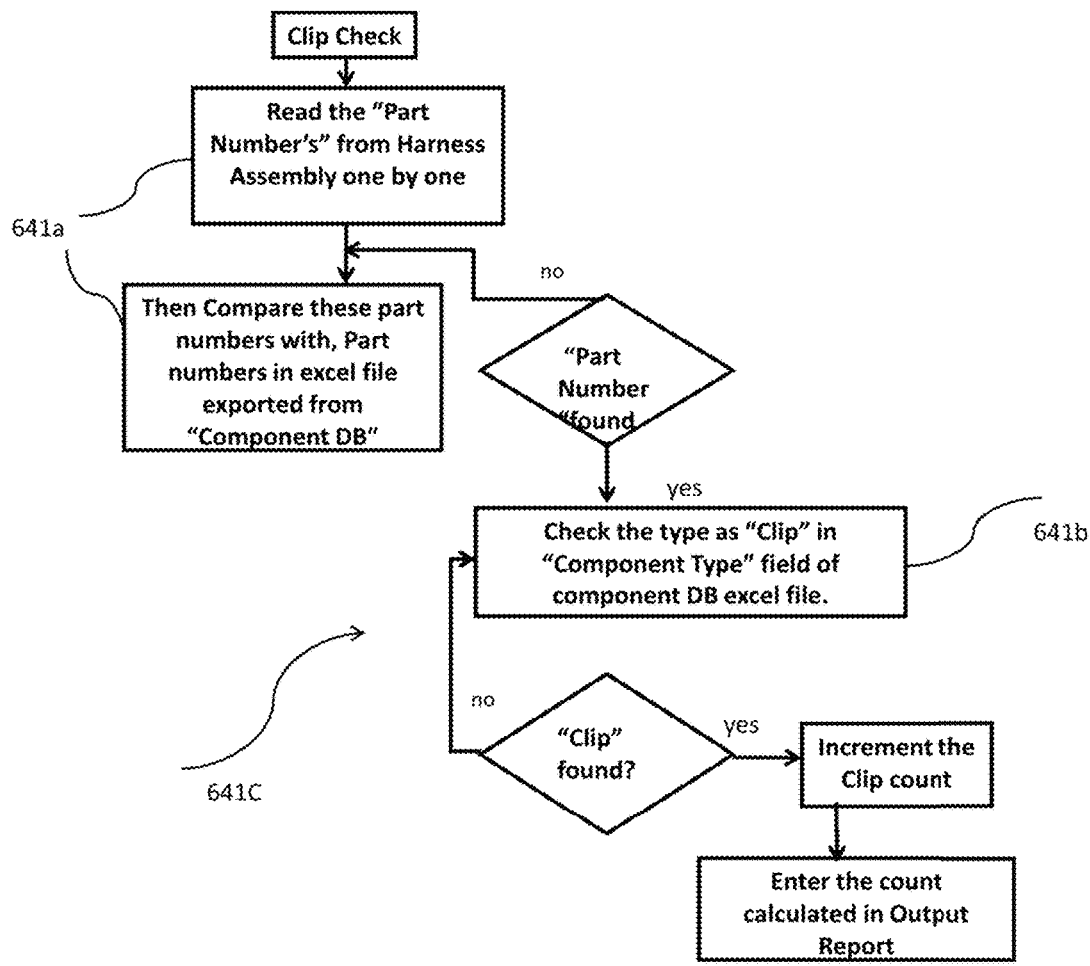
FIG. 16 shows steps for clip check.

FIG. 16 shows steps for clip (641) check. Essentially, the "EQWIC" plug-in causes
a) Reading of part number (111) in BDF (410) of Routing and Packaging assembly (400); and reading of corresponding part number (111) in Component Database (100)—see (641a)
b) Looking for the word "CLIP" in Component Database—see (641b)
c) Incrementing the count of when "CLIP" is found
d) Report Clip (641) Count.

Figure 17:
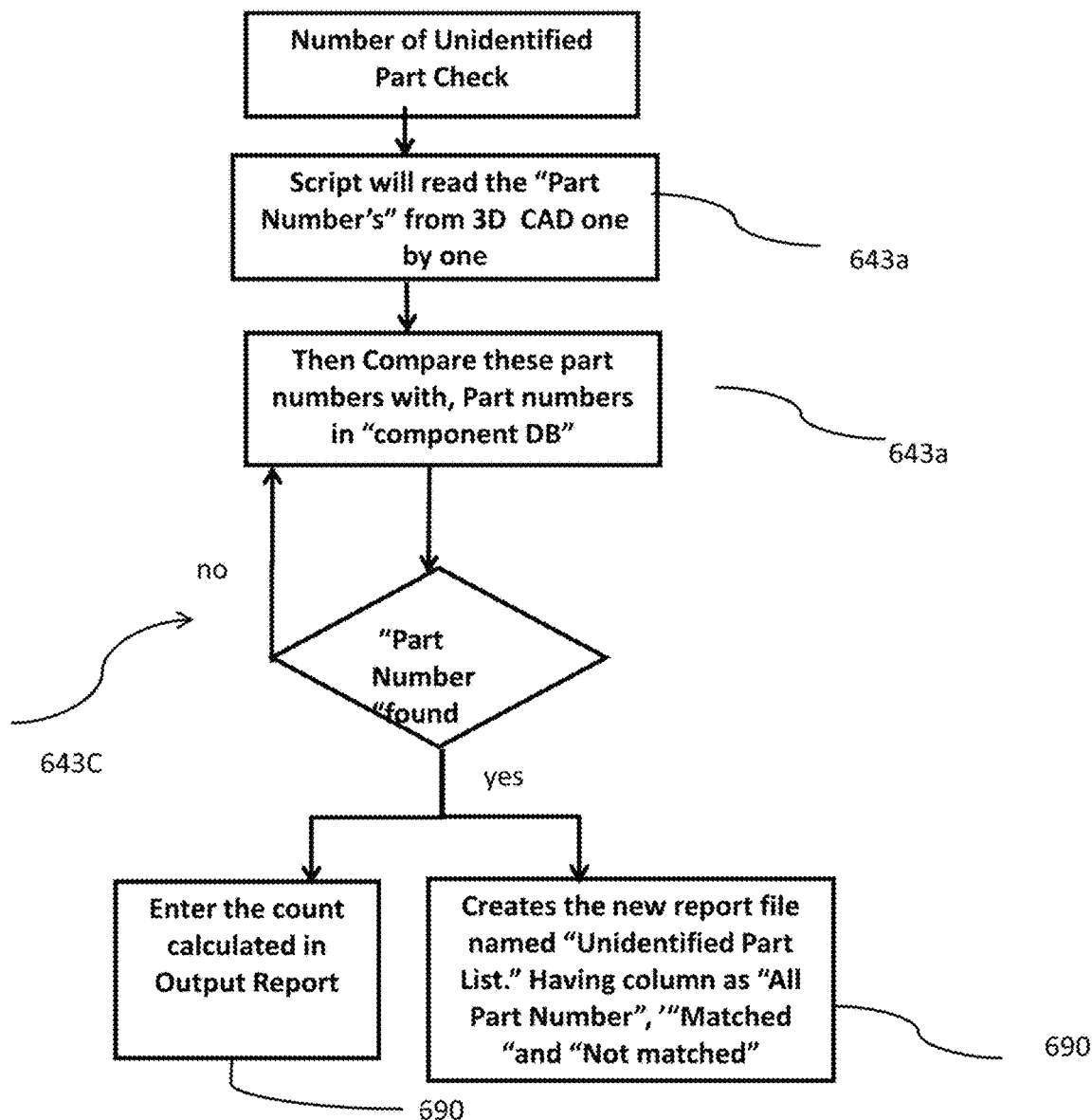
FIG. 17 steps for unidentified part (component) check.
Figure 17A:
FIG. 17A shows an illustrative report generated for unidentified part Check.

FIG. 17 steps for unidentified part (component) check. Essentially, the "EQWIC" (610) plug-in causes
a) Reading of part number in Routing and Packaging assembly (400); reading of corresponding part number from Component Database (100)
b) Output Report "Parts Found" and "Parts Not Found" (690) as shown in FIG. 17A.

Figure 18:
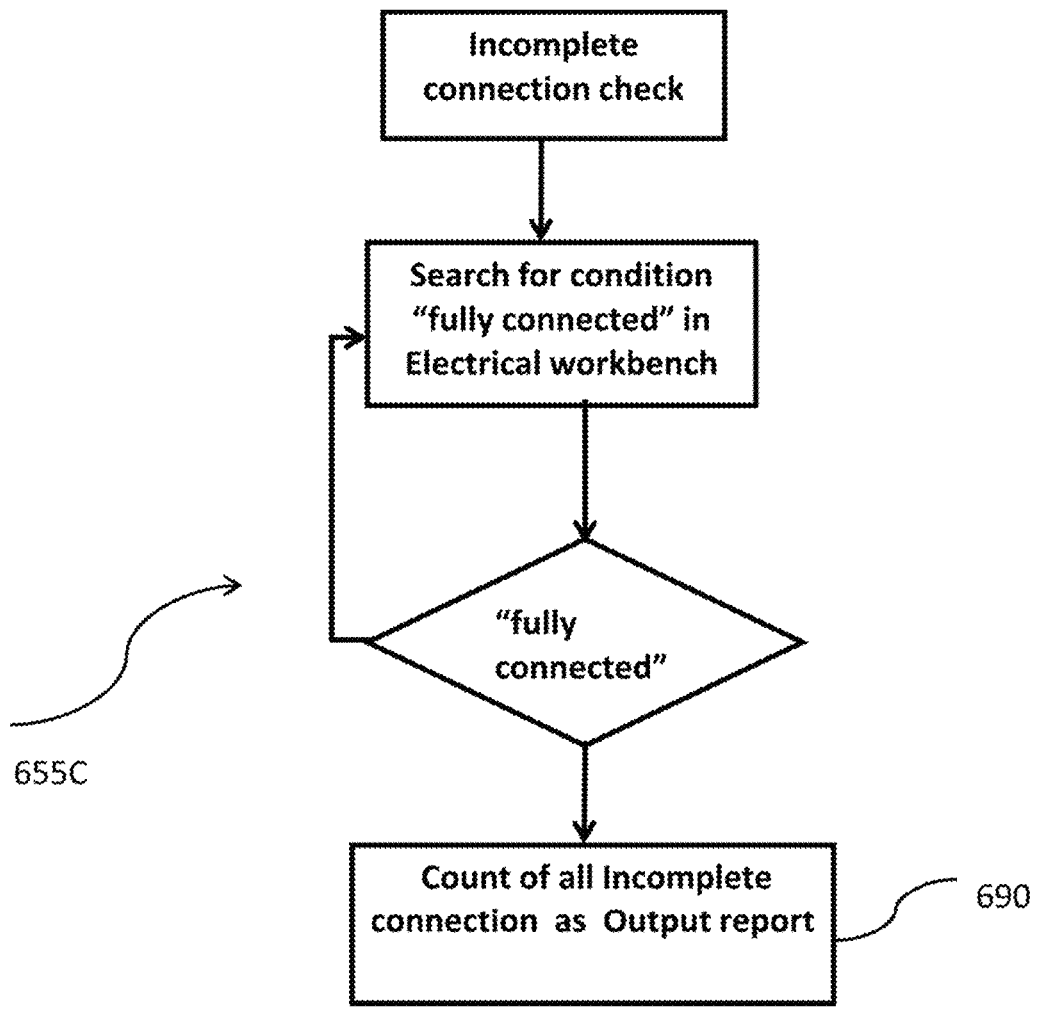
FIG. 18 shows steps for Incomplete Connection check.

FIG. 18 shows steps for Incomplete Connection check (655C). Essentially, this check examines situations where
   a wire (631) has no connector (638) at its one or both ends, or
   a connector (638) has no wire (631) at its both ends, or
   a clip (641) has no wire (631) within it.

Incomplete connection check (655C) is a feature known and commonly available in known three dimensional software suit. The plug-in "EQWIC" (610) optionally invokes Incomplete Connection check (655C) by prompting for selection of this validation requirement and eliminates the possibility of oversight of a designer not performing and thus not applying Incomplete Connection validation, though available.

Figure 19:
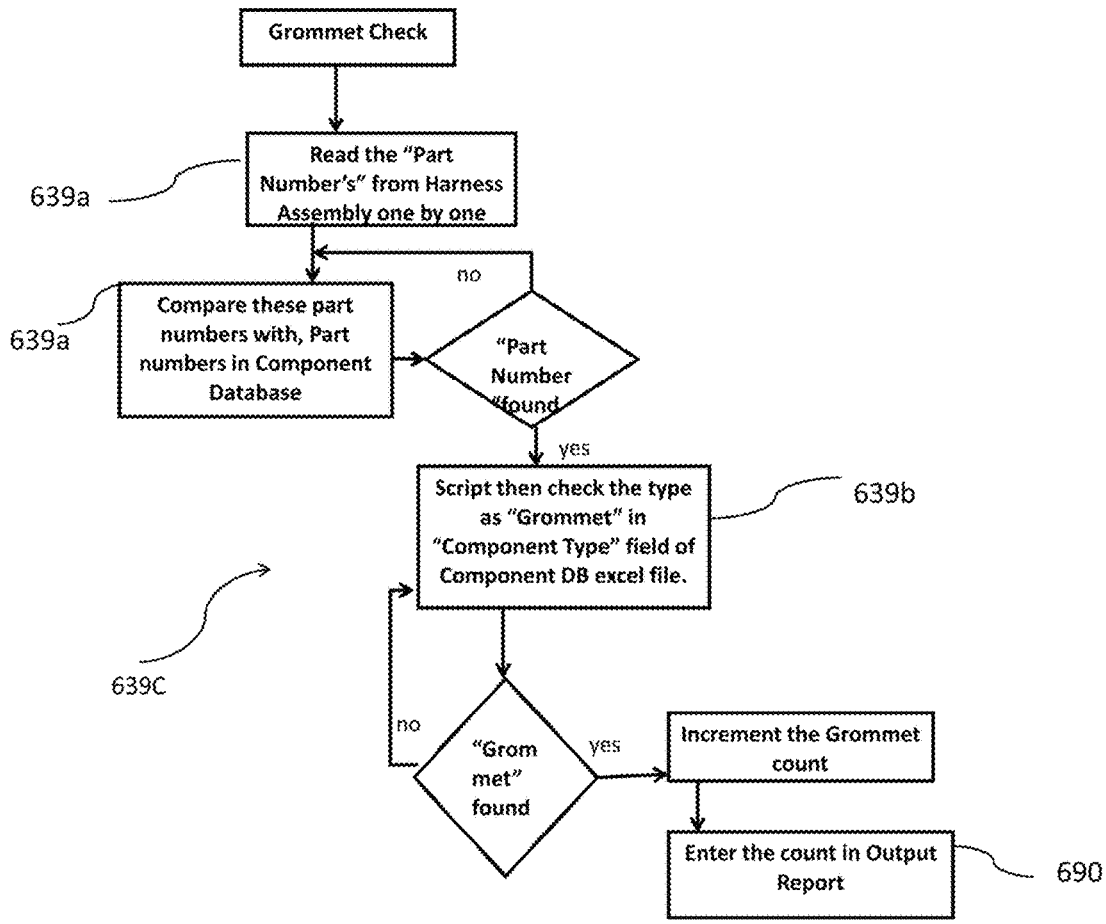
FIG. 19 shows steps for Grommet check.

FIG. 19 shows steps for Grommet check
Essentially, the "EQWIC" (610) plug-in causes
a) Reading of part number in Routing & Packaging assembly (400); and reading of corresponding part number (111) in Component Database (100)—see (639a)
b) Looking for "Grommet" (639) in Component Database (100)—see (641b)
c) Increment the count of when "Grommet" (639) is found
d) Report Grommet Count (690).

Figure 20:
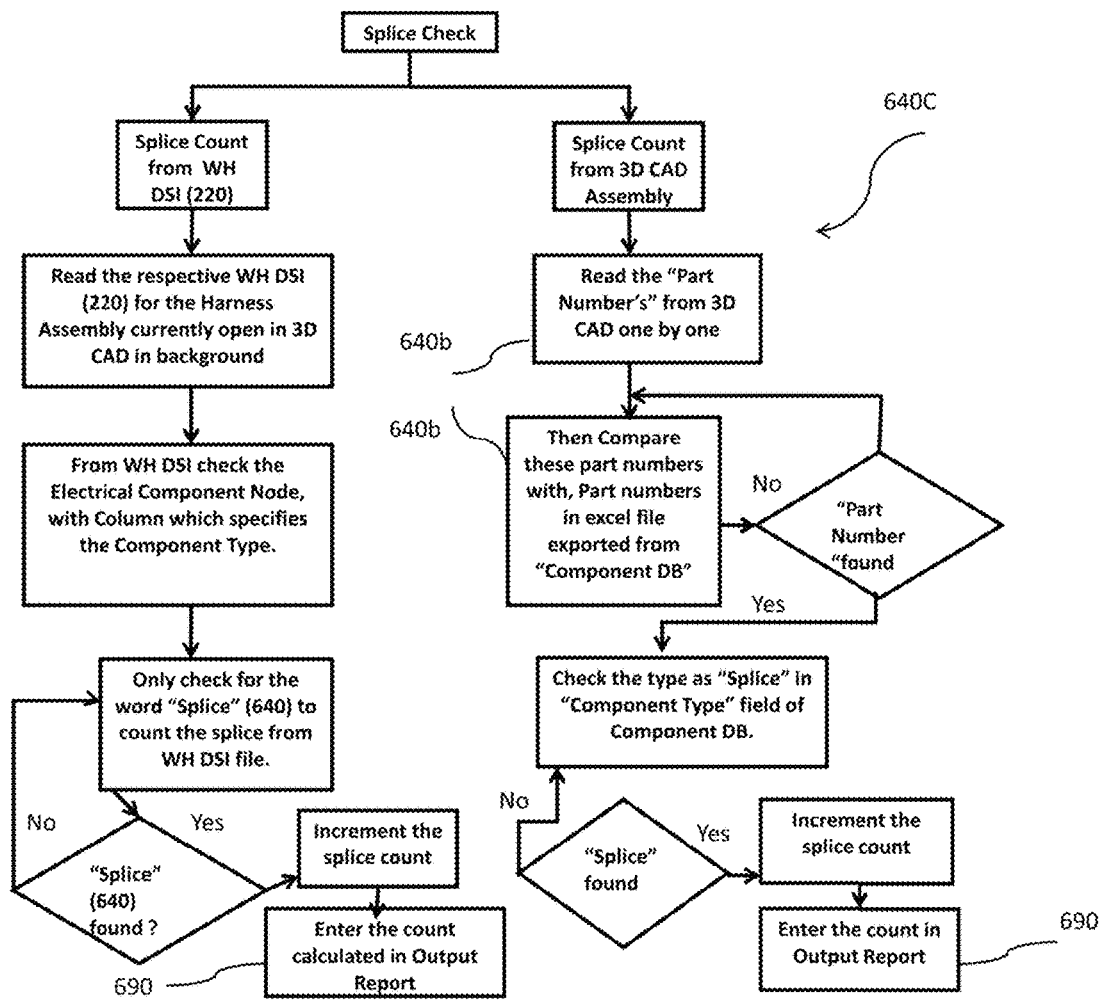
FIG. 20 shows steps for Splice check.

FIG. 20 shows steps for Splice check (640C). Essentially, the "EQWIC" (610) plug-in causes
a) Count of the word "SPLICE" (638) in the Wire Harness DSI (220) file.
b) Validate all part number (111) in Routing & Packaging assembly with respect to Component database (100)—see (640b)
c) Count splice (640) from validated output as in (640b) above.
d) Report Counts in Output (690).

Figure 21:
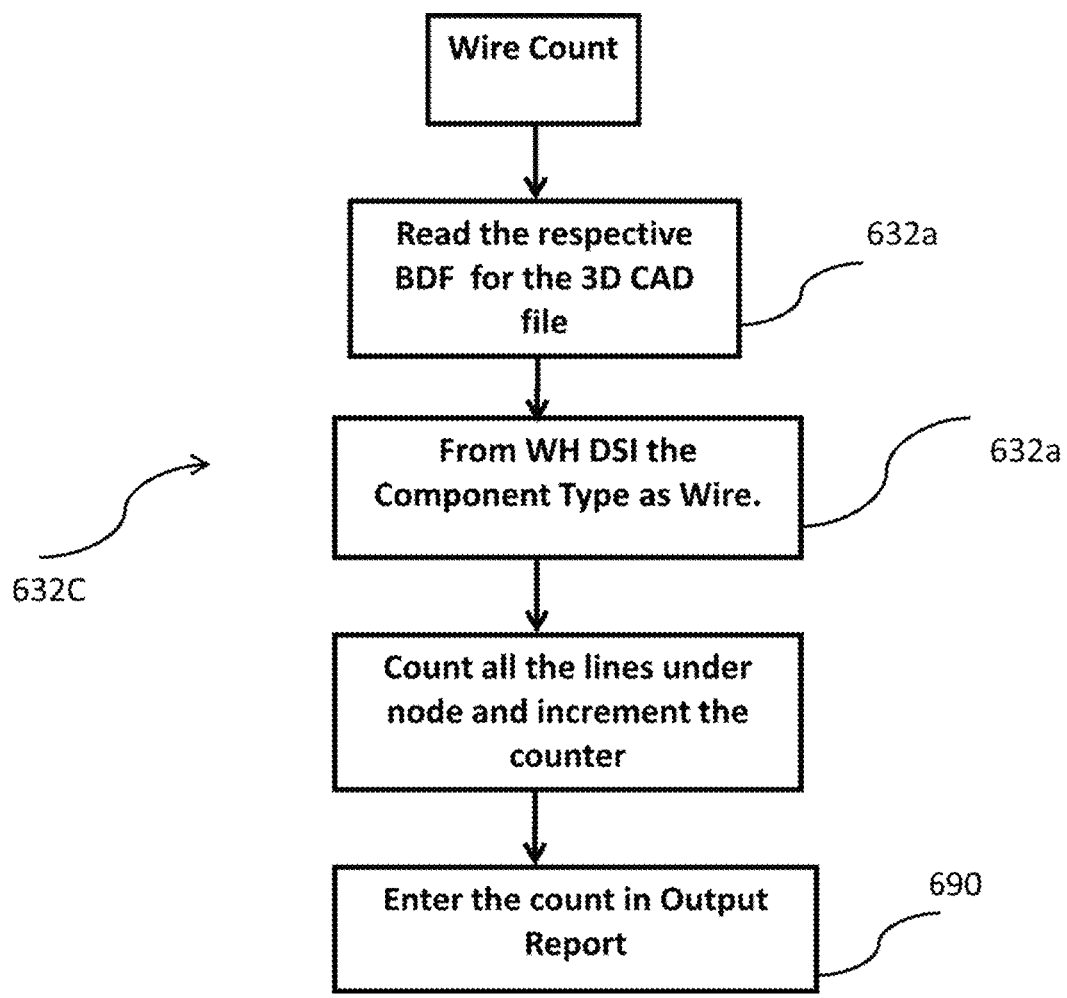
FIG. 21 shows steps of Wire Count.

FIG. 21 shows steps of Wire Count (632C). Essentially, the "EQWIC" (610) plug-in causes
a) Read BDF (410) of Routing and Packaging assembly (400); and look for component type as wire (631) in the WH CDI (220) correspondingly-see (632a).
b) Report wire Count as Output Report (690).

Figure 22:
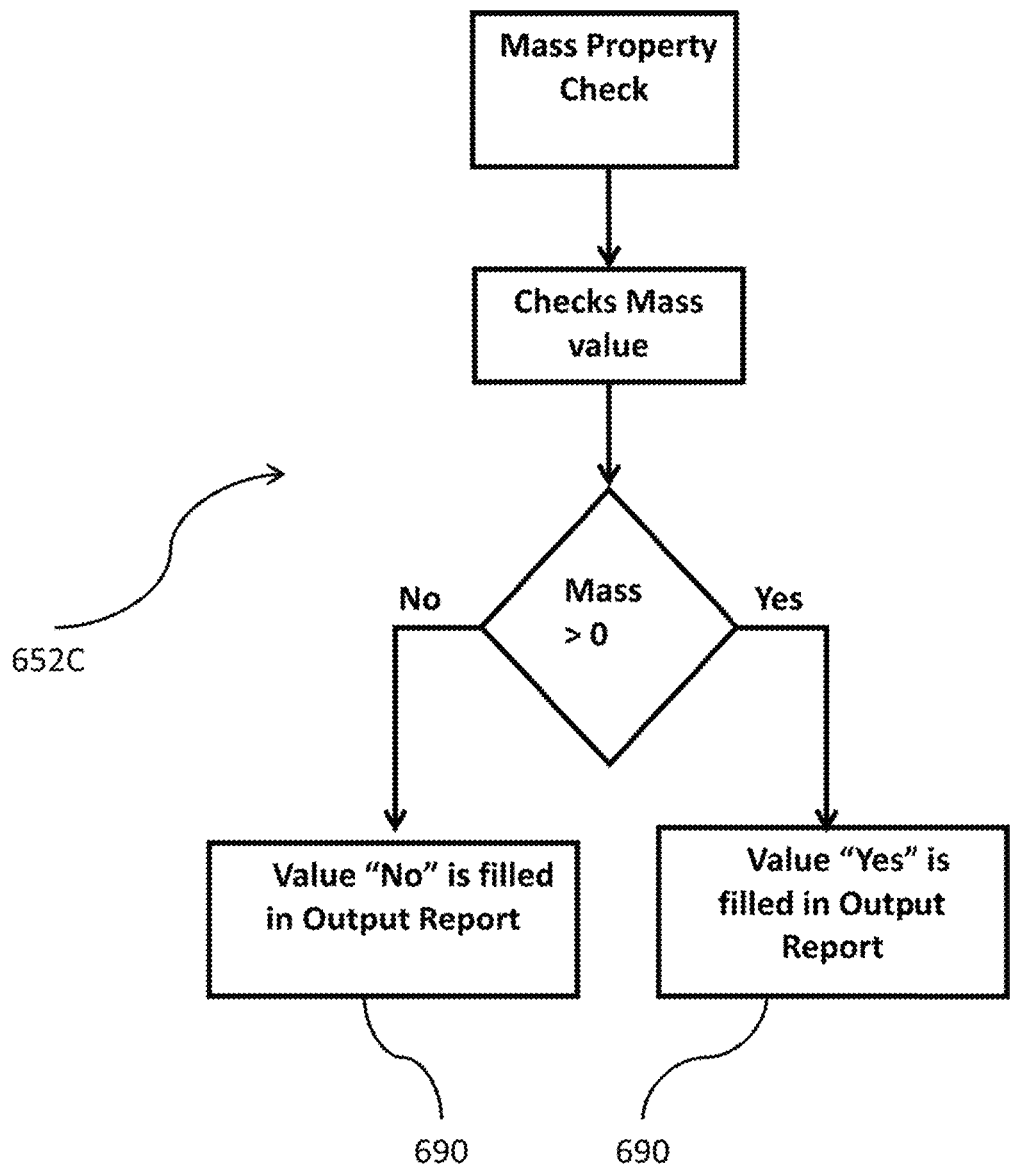
FIG. 22 shows steps for Mass Property Check.

FIG. 22 shows steps for Mass Property Check (652C). Essentially, the "EQWIC" (610) plug-in checks mass property (652) for its value and reports. When no value is assigned, the default value is zero. To be able to indicate the gross approximate weight that the physical wire harness would have, the designer assigns a non-zero positive value.

Incomplete Connection Check (655C) and Mass property Check (652C) are generally available in the three dimensional software suites. These checks are incorporated in the present invention so as to have a robust system providing comprehensive validation. Mass proper check (652C) and Incomplete connection check (655C) are therefore grouped as intrinsic validation.

Figure 23:
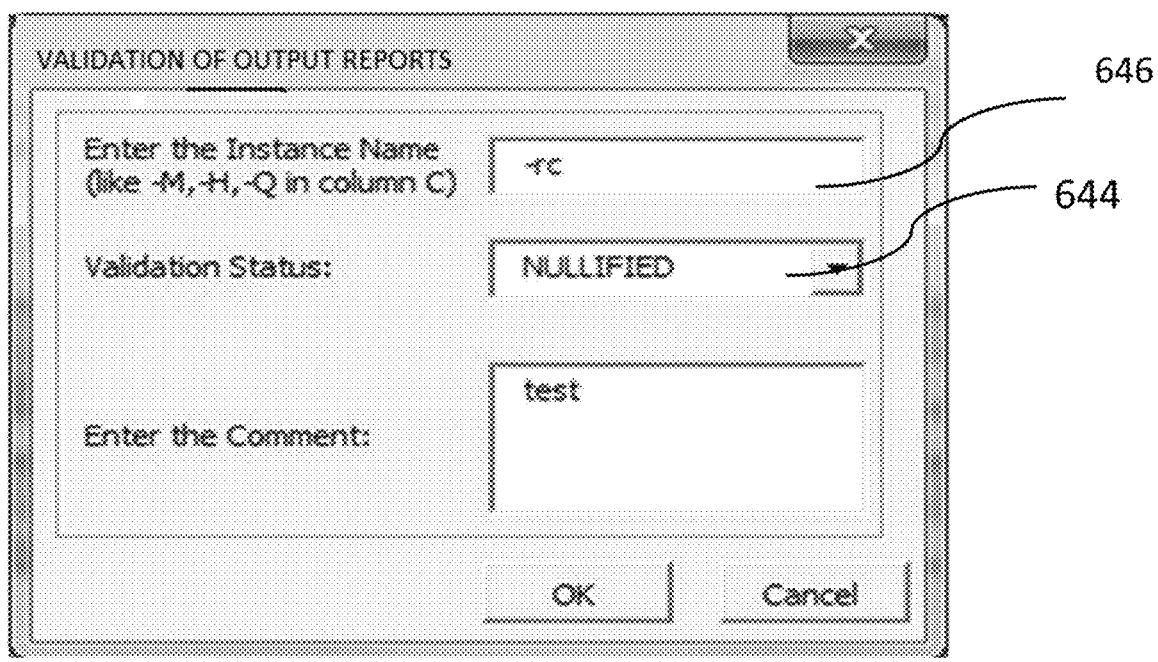
FIGS. 23 and 23A illustrates and describes Output validation.
Figure 23A:

FIG. 23 shows screen of the computer program for Output Validation (645) and FIG. 23A illustrates a report with Output validation (645). Output validation (645) signifies updating of correction in the plug-in instead of running the plug-in several times. Based on reports generated by the plug-in, the designer(s) is required to revisit and revise any of the Circuit Diagram, Harness Design or Harness assembly so as to eliminate the reported mismatch which includes miss-out or repeat. For each individual output line, the designer enters the update, illustratively shown here as either Nullified (644) or Open. Nullified (644) implies that the mismatch (629) is corrected while open signifies as uncorrected.

The plug-in provides for a version wise Output Validation, using option code (646). Version wise output validation means that the user selects a version of the equipment and enters the update.

The term multilateral validation includes alphanumeric validation and intrinsic validation and at times mentioned interchangeably with validation, whether unilateral or bilateral.

The method and system as per present invention replaces human intelligence, hitherto needed to cross validate intensely complex engineering outputs; by BDFs, which a human CANNOT read efficiently. Also, the method and system produces error free validation, which is not guaranteed by natural, nor artificial intelligence.

The system as per present invention is ancillary to complex PLMs, two-dimensional and three-dimensional software suites, which are hugely complex software suites supplementing human capabilities, which our plug-in further complements by providing a validation link between them by using BDFs generated by them.

Our inventive system for multilateral validation of wire harness design outputs, which is a "plug-in" on a PLM, is installable on specific hardware and or workstations which support industrial PLM tools, example—workstation with 64 bit operating system, NVIDIA Quadro 4000 2 GB GFX Special, and upwards.

We claim:
1. A method (500) for a multilateral validation of wire harness design outputs, comprising steps of:
   a. an alphanumeric validation of a first two dimensional output with respect to a component database (100);
   b. an alphanumeric validation of a second two dimensional output with respect to the component database (100);
   c. an alphanumeric validation between the first two dimensional output and the second two dimensional output;
   d. an intrinsic validation within a three dimensional output;
   e. an alphanumeric validation of the three dimensional output with respect to the component database (100); and
   f. an alphanumeric validation of the validated second two dimensional output with respect to the three dimensional output, said multilateral validation uses a BDF (Background Data file) (310) of said first two dimensional output, a BDF (210) of said second two dimensional output, a BDF (410) of said three dimensional output, said multilateral validation generates a plurality of output reports (680, 690) of mismatches (629) which include repeats (626) and miss-outs (627), component counts (628, 632), and provides for Output Validation (645), in prescribed formats;

wherein said first two dimensional output is a circuit schematic design (300), and said second two dimensional output is a wiring harness drawing (200); and wherein said three dimensional output is a routing and packaging assembly (400).

2. The method (500) for the multilateral validation of wire harness design outputs as claimed in claim 1, wherein said alphanumeric validation is for a common information contained in the BDF (310) of the first two dimensional output, the BDF (210) of the second two dimensional output, the BDF (410) of the three dimensional output.

3. The method (500) for the multilateral validation of wire harness design outputs as claimed in claim 1, wherein said Circuit Schematic design (300) having the BDF (310) is validated with respect to the Component Database (100), taking the Component Database (100) as reference.

4. The method (500) for the multilateral validation of wire harness design outputs as claimed in claim 1, wherein said Wire harness Drawing (200) having the BDF (210) is validated with respect to the Circuit Schematic design (300) having the BDF (310) and where neither of the BDFs (210) of the wire harness Drawing (200) nor the BDF (310) of the Circuit Schematic Design (300) is considered as reference.

5. The method (500) for the multilateral validation of wire harness design outputs as claimed in claim 1, wherein the routing & packaging assembly (400) having the BDF (410) is intrinsically validated within a three-dimensional software suite.

6. The method (500) for the multilateral validation of wire harness design outputs as claimed in claim 1, wherein the Wire Harness drawing (200) having the BDF (210) is validated with respect to the routing and packaging (400) having the BDF (410).

7. The method (500) for the multilateral validation of wire harness design outputs as claimed in claim 1, wherein said alphanumeric validation is for a plurality of attributes (110) of a plurality of components (630).

8. The method (500) for the multilateral validation of wire harness design outputs as claimed in claim 1, wherein said Output validation (645) is of reported mismatches attended.

9. A system (600) for multilateral validation of wire harness design outputs, in the form of a computer program residing on a computer processor, the computer processor being part of a computer system, comprising of:

one or more non transitory computer readable storage media having computer-executable instructions of a product life cycle management, abbreviated as a PLM (700) embodied thereon, wherein the computer program, plugged in the PLM (700), when invoked, causes, as per user interface selection, execution of the multilateral validation between a first two dimensional output to a second two dimensional output and the multilateral validation of a validated second two dimensional output to a three dimensional output, with respect to one another and with respect to a component database (100) in the form of:

(a) an alphanumeric validation of a BDF(Background Data file) (210) of a two dimensional wire harness drawing (200), with respect to a BDF (310) of a two dimensional circuit schematic design (300) and a Component Database (100);

(b) an intrinsic validation of a three dimensional Routing & Packaging assembly (400); and (c) an alphanumeric validation of a BDF (210) of a two dimensional wire Harness drawing (200) with respect to BDF (410) of a three dimensional routing & Packaging assembly (400);

the alphanumeric validations is for a plurality of component (630), the multilateral validation executable in batches or interactively, the multilateral validation being a custom-built validation, unilateral and or bilateral, generates a plurality of output reports (680, 690), mismatch (629) includes miss-outs (627) and repeats (626), counts (628, 632) and provides for Output validation (645);

wherein said first two dimensional output is a circuit schematic design (300), and said second two dimensional output is a wiring harness drawing (200); and wherein said three dimensional output is a routing and packaging assembly (400).

10. The system for the multilateral validation of wire harness design outputs as claimed in claim 9, wherein said alphanumeric validation of the BDF (210) of the Wire harness Drawing (200), the BDF (310) of the Circuit Schematic Design (300), of the BDF (410) of the Routing and Packaging assembly(400) is for a plurality of attributes (110) of the plurality of component (630).

11. The system for the multilateral validation of wire harness design outputs as claimed in claim 10, wherein alphanumeric validation of the BDF (210) of the Wire harness Drawing (200), the BDF (310) of the Circuit Schematic Design (300), and the BDF (410) of the Routing and Packaging assembly (400) is a combination check (642C) of a plurality of attributes (110).

12. The system for the multilateral validation of wire harness design outputs as claimed in claim 9, wherein said intrinsic validation is for a mass property (652) and an incomplete connection (655) in the three dimensional routing and packaging assembly (400).

13. The system for the multilateral validation of wire harness design outputs as claimed in claim 9, wherein said plurality of Output reports (680, 690) for the alphanumeric validation of the BDF (210) of the Wire harness Drawing (200), the BDF (310) of the Circuit Schematic Design (300), and the BDF (410) of the Routing and Packaging assembly (400) for a plurality of wire (631) gives a mismatch in count (632), a mismatch in size (633), a mismatch in TO information (634), a mismatch in FROM information (635), a wire (631) absent in the BDF (310) of the Circuit Schematic Design (300) but present in the BDF (210) of the Wire harness Drawing (200), the wire (631) with a missing instance name (112).

14. The system for the multilateral validation of wire harness design outputs as claimed in claim 9, wherein said plurality of Output reports (680, 690) for the alphanumeric validation of the plurality of component (630) other than a plurality of wire (631) gives the miss-out (627), the repeat (626), as the mismatch (629).

15. The system for the multilateral validation of wire harness design outputs as claimed in claim 9, wherein any or all validation checks are user selectable.

16. The system for the multilateral validation of wire harness design outputs as claimed in claim 9, wherein said plurality of Output reports (690) for the intrinsic validation is of an incomplete connection (655) and gives count of an unconnected wire or a component (630) other than a plurality of wire (631).

17. The system for the multilateral validation of wire harness design outputs as claimed in claim 9, wherein said plurality of Output reports (690) for the intrinsic validation is of a Mass property (652) and gives a value of the Mass property (652) as zero or non-zero.

18. The system for the multilateral validation of wire harness design outputs as claimed in claim 9, wherein said plurality of Output reports (680, 690) is at an identified memory location.

19. The system for the multilateral validation of wire harness design outputs as claimed in claim 9, wherein said Output validation (645) is of a reported mismatch (629) attended.

20. The system for the multilateral validation of wire harness design outputs as claimed in claim 9, wherein said Output validation (645) is version wise based on an option code.

21. The system for the multilateral validation of wire harness design outputs as claimed in claim 9, wherein said BDF (210) of the Wire harness Drawing is in a DSI format as a WH DSI (220) and wherein said BDF (310) of the Circuit Schematic Design (300) is in a DSI format as a CKT DSI (320).

\* \* \* \* \*